US012491432B2

(12) United States Patent
Monti

(10) Patent No.: US 12,491,432 B2
(45) Date of Patent: Dec. 9, 2025

(54) SIMULATION SYSTEMS AND METHODS INCLUDING PERIPHERAL DEVICES PROVIDING HAPTIC FEEDBACK

(71) Applicant: StrikerVR Inc., New Orleans, LA (US)

(72) Inventor: Kyle Monti, Luling, LA (US)

(73) Assignee: STRIKERVR, INC., New Orleans, LA (US)

( * ) Notice: Subject to any disclaimer, the term of this patent is extended or adjusted under 35 U.S.C. 154(b) by 0 days.

(21) Appl. No.: 18/657,068

(22) Filed: May 7, 2024

(65) Prior Publication Data

US 2024/0286029 A1 Aug. 29, 2024

Related U.S. Application Data

(63) Continuation of application No. 17/669,263, filed on Feb. 10, 2022, now Pat. No. 12,005,346.

(Continued)

(51) Int. Cl.
*A63F 13/245* (2014.01)
*A63F 13/214* (2014.01)
(Continued)

(52) U.S. Cl.
CPC .......... *A63F 13/245* (2014.09); *A63F 13/214* (2014.09); *A63F 13/285* (2014.09);
(Continued)

(58) Field of Classification Search
CPC ........ A63F 13/20; A63F 13/21; A63F 13/211; A63F 13/212; A63F 13/217;
(Continued)

(56) References Cited

U.S. PATENT DOCUMENTS 6,902,483 B2 6/2005 Lin
7,510,477 B2 3/2009 Argentar
(Continued)

FOREIGN PATENT DOCUMENTS

WO 2020153116 7/2020

OTHER PUBLICATIONS

International Preliminary Report on Patentability issued in App. No. PCT/US2022/016012, mailing date Aug. 24, 2023, 9 pages.

*Primary Examiner* — Omkar A Deodhar
(74) *Attorney, Agent, or Firm* — Jason P. Mueller; FisherBroyles, LLP

(57) ABSTRACT

A disclosed system includes a computing device that generates a virtual reality simulation, a head mounted display worn by a user, and a peripheral device having a haptic actuator. The system is configured to generate an immersive simulation experience for a user of the system and to control and update the virtual reality simulation based on detected motion of the peripheral device and signals generated by the peripheral device in response to user input to the peripheral device. The peripheral device includes a trigger that causes the haptic actuator to generate haptic reaction forces/impulses in response to actuation of the trigger, with actuation of the trigger further influencing the virtual reality simulation. The peripheral device includes first and second grips and is configured to be held by one hand of a user holding the first grip or by two hands of the user holding the first and second grips.

17 Claims, 15 Drawing Sheets

Related U.S. Application Data

(60) Provisional application No. 63/148,039, filed on Feb. 10, 2021.

(51) Int. Cl.

| | |
|---|---|
| ***A63F 13/285*** | (2014.01) |
| ***A63F 13/837*** | (2014.01) |
| ***G06F 3/01*** | (2006.01) |
| ***G06F 3/044*** | (2006.01) |

(52) U.S. Cl.
CPC ............ *A63F 13/837* (2014.09); *G06F 3/016* (2013.01); *G06F 3/044* (2013.01)

(58) Field of Classification Search
CPC ...... A63F 13/218; A63F 13/219; A63F 13/22; A63F 13/23; A63F 13/24; A63F 13/245; A63F 13/285; A63F 13/837; A63F 2300/1037
See application file for complete search history.

(56) References Cited

U.S. PATENT DOCUMENTS

| | | | | |
|---|---|---|---|---|
| D622,802 | S | 8/2010 | Fitzpatrick | |
| 8,313,379 | B2 * | 11/2012 | Ikeda | A63F 13/98 345/158 |
| 8,419,541 | B2 | 4/2013 | Mao | |
| 8,469,824 | B1 | 6/2013 | Farley | |
| D693,420 | S | 11/2013 | Abbott | |
| 8,591,333 | B2 | 11/2013 | Ashida | |
| D715,882 | S | 10/2014 | Jonker | |
| 8,920,172 | B1 | 12/2014 | Wilmink | |
| D723,128 | S | 2/2015 | Hu | |
| D729,880 | S | 5/2015 | Nichols | |
| D730,999 | S | 6/2015 | Stevens | |
| D740,908 | S | 10/2015 | Tresserras Torre | |
| D745,103 | S | 12/2015 | Corsi | |
| D750,722 | S | 3/2016 | Young | |
| D762,277 | S | 7/2016 | Juarez | |
| D766,381 | S | 9/2016 | Crye | |
| D779,012 | S | 2/2017 | Abbott | |
| D787,619 | S | 5/2017 | Young | |
| 9,784,524 | B1 | 10/2017 | Ma | |
| D814,591 | S | 4/2018 | Koçgür | |
| D814,598 | S | 4/2018 | Monti | |
| 10,022,625 | B2 | 7/2018 | Black | |
| 10,030,937 | B2 | 7/2018 | Northrup | |
| D826,204 | S | 8/2018 | Ozkaner | |
| D834,132 | S | 11/2018 | Demonico | |
| D847,137 | S | 4/2019 | Monti | |
| 10,449,443 | B2 | 10/2019 | Gutierrez | |
| D873,368 | S | 1/2020 | Morrow | |
| 10,572,016 | B2 | 2/2020 | Ballard | |
| D877,281 | S | 3/2020 | Jones | |
| D888,872 | S | 6/2020 | Pedersen | |
| D905,062 | S | 12/2020 | Fuchs | |
| D905,692 | S | 12/2020 | Fuchs | |
| 10,852,093 | B2 | 12/2020 | Monti | |
| D915,353 | S | 4/2021 | Maier | |
| 2007/0132785 | A1 | 6/2007 | Ebersole | |
| 2009/0280901 | A1 | 11/2009 | Casparian | |
| 2009/0325699 | A1 | 12/2009 | Delgiannidis | |
| 2012/0157263 | A1 * | 6/2012 | Sivak | G16H 40/63 482/4 |
| 2014/0168261 | A1 | 6/2014 | Margolis | |
| 2016/0232715 | A1 | 8/2016 | Lee | |
| 2017/0354864 | A1 | 12/2017 | Rogers | |
| 2018/0050269 | A1 | 2/2018 | Jones | |
| 2019/0226808 | A1 * | 7/2019 | Gallery | F41A 33/00 |
| 2020/0159337 | A1 * | 5/2020 | Kin | G06F 3/017 |
| 2020/0174552 | A1 * | 6/2020 | Stafford | A63F 13/25 |
| 2020/0201460 | A1 * | 6/2020 | Erivantcev | G06F 3/017 |
| 2020/0225768 | A1 * | 7/2020 | Nietfeld | A63F 13/24 |
| 2020/0263957 | A1 | 8/2020 | Northrup | |
| 2020/0368616 | A1 * | 11/2020 | Delamont | H04N 13/239 |
| 2020/0398153 | A1 * | 12/2020 | Ironmonger | A63F 13/428 |

* cited by examiner

SIMULATION SYSTEMS AND METHODS INCLUDING PERIPHERAL DEVICES PROVIDING HAPTIC FEEDBACK

This application is a continuation of U.S. patent application Ser. No. 17/669,263, filed Feb. 10, 2022, which claims the benefit of U.S. Provisional Patent Application No. 63/148,039, the contents of which are incorporated herein by reference.

BACKGROUND

The present application discloses a peripheral device and methods of using the peripheral device that can be used in connection with simulations and gaming. In particular, the peripheral device can be used in connection with simulations and gaming that provide a user with a virtual or augmented reality simulation or gaming space.

A peripheral device as disclosed herein can be held in a user's hands and manipulated as part of a simulation or game play. One or more haptic actuators may be mounted in or on the peripheral, and those actuators can be controlled to provide a user with various types of haptic feedback as part of a simulation or game play. Signals for controlling the haptic actuators can originate from a controller mounted in or on the peripheral. Alternatively, haptic actuator control signals can be generated by external controllers that handle the virtual reality simulation or game play, and such haptic actuator control signals can be communicated to the peripheral via a wired or wireless connection.

A peripheral device as disclosed herein can also include one or more capacitive touch sensors mounted at various locations on a body of the peripheral. Signals generated by the capacitive touch sensors can be used to detect positions of and movements of a user's hands. In some instances, the signals from the capacitive touch sensors can also indicate the amount of pressure that a user's hand is exerting on the peripheral. Such information can be communicated to one or more controllers responsible for controlling a virtual reality simulation or game play, and those signals can be used by the one or more controllers to accurately depict how a user's hands are located or moved in a virtual reality space. Sensed positions or movements of a user's hands can also determine how the simulation or game play is conducted.

BRIEF DESCRIPTION OF THE DRAWINGS

The accompanying drawings are part of this disclosure and are incorporated into the specification. The drawings illustrate example embodiments of the disclosure and, in conjunction with the description and claims, serve to explain various principles, features, or aspects of the disclosure. Certain embodiments of the disclosure are described more fully below with reference to the accompanying drawings. However, various aspects of the disclosure may be implemented in many different forms and should not be construed as being limited to the implementations set forth herein. Like numbers refer to like, but not necessarily the same or identical, elements throughout.

DETAILED DESCRIPTION

This disclosure generally relates to systems and methods that provide an immersive simulation experience to users of the system. Such systems may include a system controller (e.g., a computing device) that generates a virtual reality (VR) simulation, a head mounted display (HMD), and/or a projection based display that provides a virtual reality visual experience to a user, and one or more peripheral devices that allow a user to interact with the simulated environment. Peripheral devices may include haptic actuators that provide haptic feedback to system users based on movement of the peripheral devices and actuation of various user-input devices associated with the peripheral devices.

Peripheral devices may be configured to provide haptic feedback for gaming devices and simulations systems, including gaming firearms and other peripheral devices used in various gaming environments. For example, the action of pulling a trigger of a simulated firearm may cause a haptic actuator of the simulated firearm to generate a haptic force or impulse that simulates a recoil impulse of a conventional firearm. Certain embodiments may further provide a laser to simulate a path of a bullet fired from a firearm being simulated by system. Certain peripheral devices may be configured to simulate a plurality of user-selectable firearms. Peripheral devices may further be configured to simulate a wide variety of gaming related devices, such as a tennis racket, a baseball bat, a magic wand, a hockey stick, a cricket bat, a badminton racket, a pool cue, boxing glove(s), a sword, a light saber, a bow and arrow, a golf club, a fishing pole, etc. Such peripheral devices may further simulate one or more secondary actions of a system being emulated, for example, a halo plasma gun, a broken bat, bat vibrations after hitting baseball, firearm charging/loading, a force field, a grenade launcher, environmental effects like rumbling of the peripheral device due to a nearby explosion or due to interaction with a virtual object, etc.

Disclosed systems may include tracking systems that provide three-dimensional (3D) information regarding position and motion of one or more peripheral devices. The controller/computing device that generates the virtual reality simulation may then use such 3D information to update a virtual space generated by the virtual reality simulation and may send updated visual information of the virtual space to the HMD or other visual system.

Figure 1:
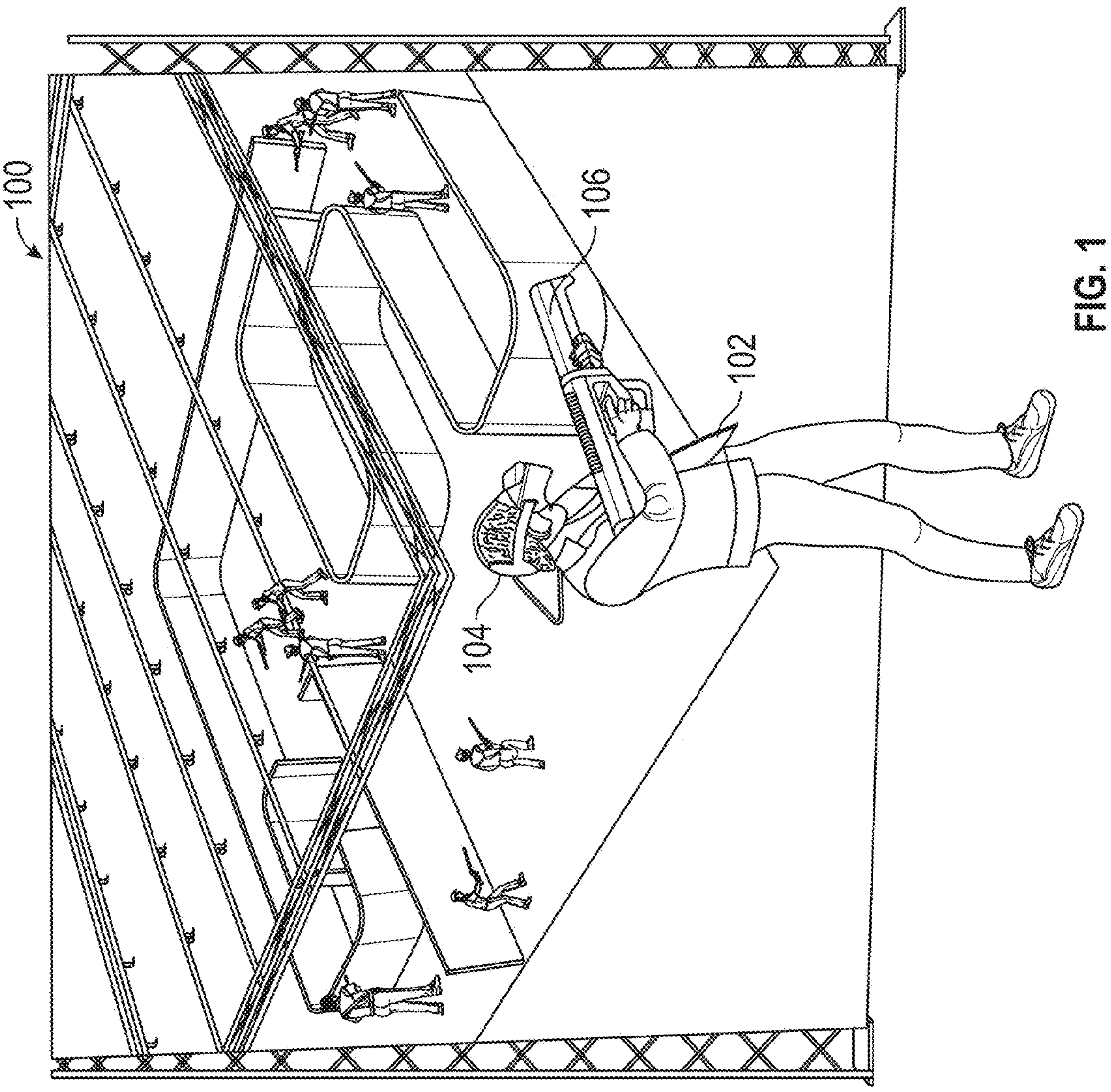
FIG. 1 illustrates an operational environment of a system that provides an immersive simulation experience to a user of the system, according to an embodiment.

FIG. 1 illustrates an operational environment 100 of a system that provides an immersive simulation experience to a user of the system, according to an embodiment. In this example, a user 102 is wearing a HMD 104 and operating a peripheral device 106. Peripheral device 106 is configured as a simulated firearm. Peripheral device 106 may include user-input devices, such as a switch configured as a firearm trigger. Actuating the trigger may cause haptic devices within peripheral device 106 to generate a force or impulse that may simulate a firearm recoil. Peripheral device 106 may interact wirelessly with a controller/computing device (not shown) that generates a virtual reality simulation that is visually projected to the user via HMD 104. As such, the controller may send to, and receive signals from, peripheral device 106 and HMD 104. Position and motion information of peripheral device 106 may be determined in real time by various tracking devices, as described below. Further, HMD 104 and peripheral device 106 may be powered by batteries, super-capacitors, etc., to thereby operate in a "tetherless" mode. Other embodiments may include wired connections between one or more components of the system.

The operational environment 100 of FIG. 1 involves a completely tetherless setup in which user 102 is free to move around the location. This type of tracking is called "outside-in tracking." In this setup cameras (not shown) are provided that point at a user from preconfigured positions around the tracked space. The cameras capture information from tracking devices either provided on peripheral device 106 (as described below) or tracking devices (not shown) worn by user 102. The information captured by the cameras allow tracking of positions and motion of the user and peripheral device 106.

Embodiments based on HMD 104 devices including the Oculus Quest, Oculus Quest 2, Huawei VR Glass, and other headsets of this type are configured to perform inside-out tracking. Inside-out tracking incorporates the cameras onto HMD 104 and these cameras look out to the world to determine position information based on motion of the user's head relative to stationary objects like walls and floors. Such cameras additionally watch for tracked objects like hand controllers and peripherals and may determine positions of these objects relative to HMD 104.

Figure 2:
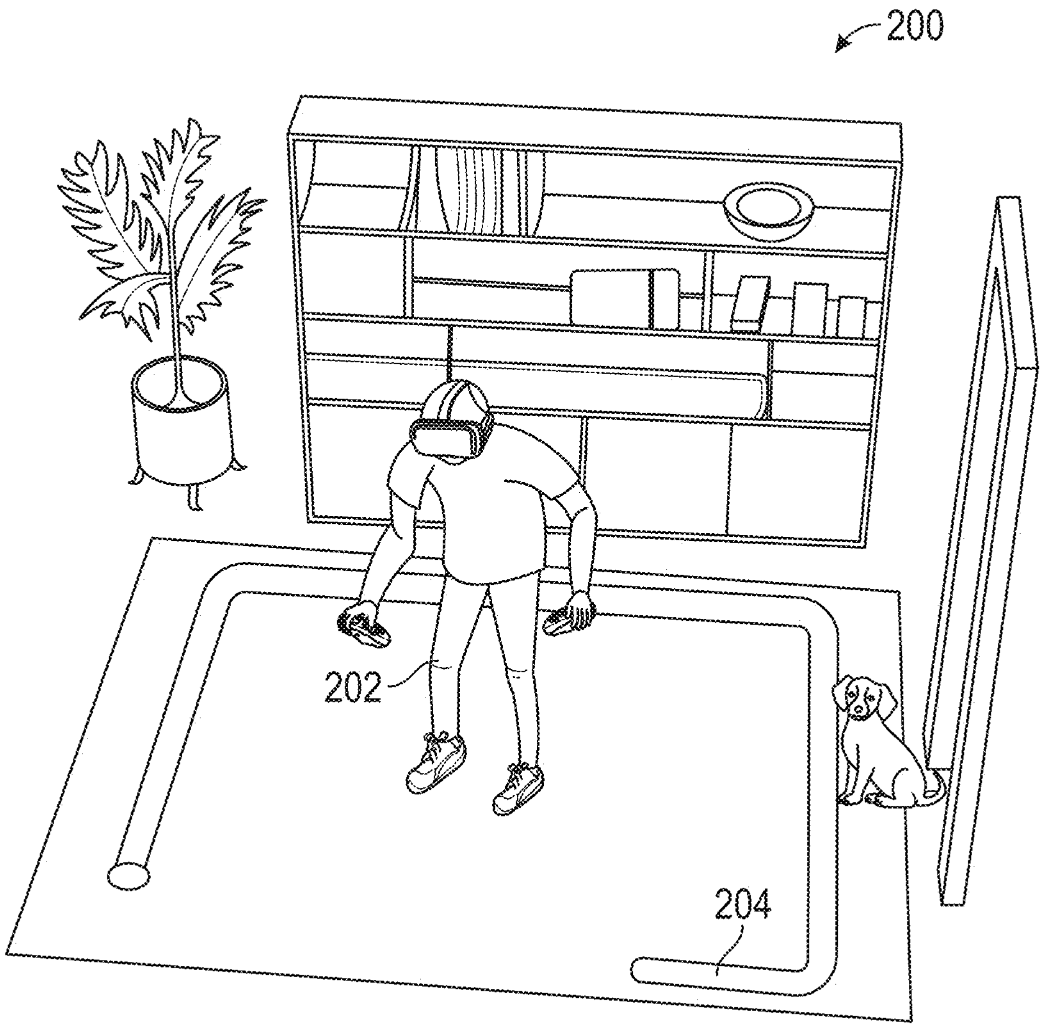
FIG. 2 illustrates a virtual reality visual experience generated by the system, according to an embodiment.

FIG. 2 illustrates a virtual reality visual experience 200 as generated by the system, according to an embodiment. Visual experience 200 is an example of a virtual reality simulation generated by a controller. A person 202 immersed in the virtual reality experience may move about within a defined space. In this example, the defined space is surrounded by a boundary 204. Boundary 204 surrounds a defined "safe space" within which a user may operate the system while the user is within the virtual reality simulation. The system may be configured such that boundary 204 is transparent after the simulation is initiated. If a user gets too close to boundary 204, however, the system may be configured to display boundary 204 (i.e., the boundary 204 may "light up") to alert the user to back away from boundary 204 and to reorient themself to a safe position. Depending on the physical space in which a user operates the system, boundary 204 may take on various shapes and sizes. For example, boundary 204 may enclose an 8 ft×8 ft area, a 20 ft×20 ft area, a 100 ft×100 ft are, etc.

In addition to providing an immersive experience for gamers, disclosed systems and methods may be used for realistic training simulations. Disclosed systems and methods allow virtual placement of a trainee in a situation that may either be too expensive or too dangerous to replicate in real-life. Training with HMDs cover a wide range of applications, including but not limited to driving, welding and spray painting, flight and vehicle simulators, soldier training, medical procedure/surgery training, etc. For example, firearms training for military personnel, law enforcement officers, and private citizens increasingly encompasses role playing and decision making, in addition to marksmanship. Such training often includes competing against role players and/or responding to situations projected onto a screen in front of the trainee or projected via a HMD worn by the trainee. The training simulator may further provide opportunities to conduct decision-making training scenarios projected on a screen, with the safety and reduced facilities cost of using a laser, for example, instead of live ammunition. Such training simulations may duplicate a sufficient number of the characteristics of a conventional firearm so that the training may effectively carry over to a conventional firearm.

Position and motion information determined by tracking systems may be provided to a simulation controller (e.g., a computing system) that generates the virtual reality simulation. As described above, a visual experience may be generated by the controller and may be provided to a user via a visual projection onto a screen or via a HMD worn by the gamer/trainee. The controller may communicate with peripheral devices and with an HMD using a wired connection or using wireless communication systems. In wireless configurations, systems may include peripheral devices that are powered by batteries or by other energy storage devices, such as super-capacitors or ultra-capacitors. Such power sources may provide electrical power to wireless communication devices, tracking devices, and haptic actuators of peripheral devices. For example, a peripheral device may house a number of super-capacitors electrically connected in series or in parallel or in multiple configurations of series and parallel to produce a viable voltage and current source to power haptic actuator systems.

In various embodiments, characteristics of a conventional firearm may be duplicated including size, weight, grip configuration, trigger reach, trigger pull weight, type of sights, level of accuracy, method of reloading, method of operation, location and operation of controls, and/or recoil. Disclosed systems may also simulate additional operations of a particular firearm, including sighting, positioning of the firearm controls, and methods of operation of the firearm. Systems may be configured to simulate firearm recoil, cyclic rate, configuration, controls, and mode of operation of the firearm for which it is intended to be used to train a shooter.

Figure 3:
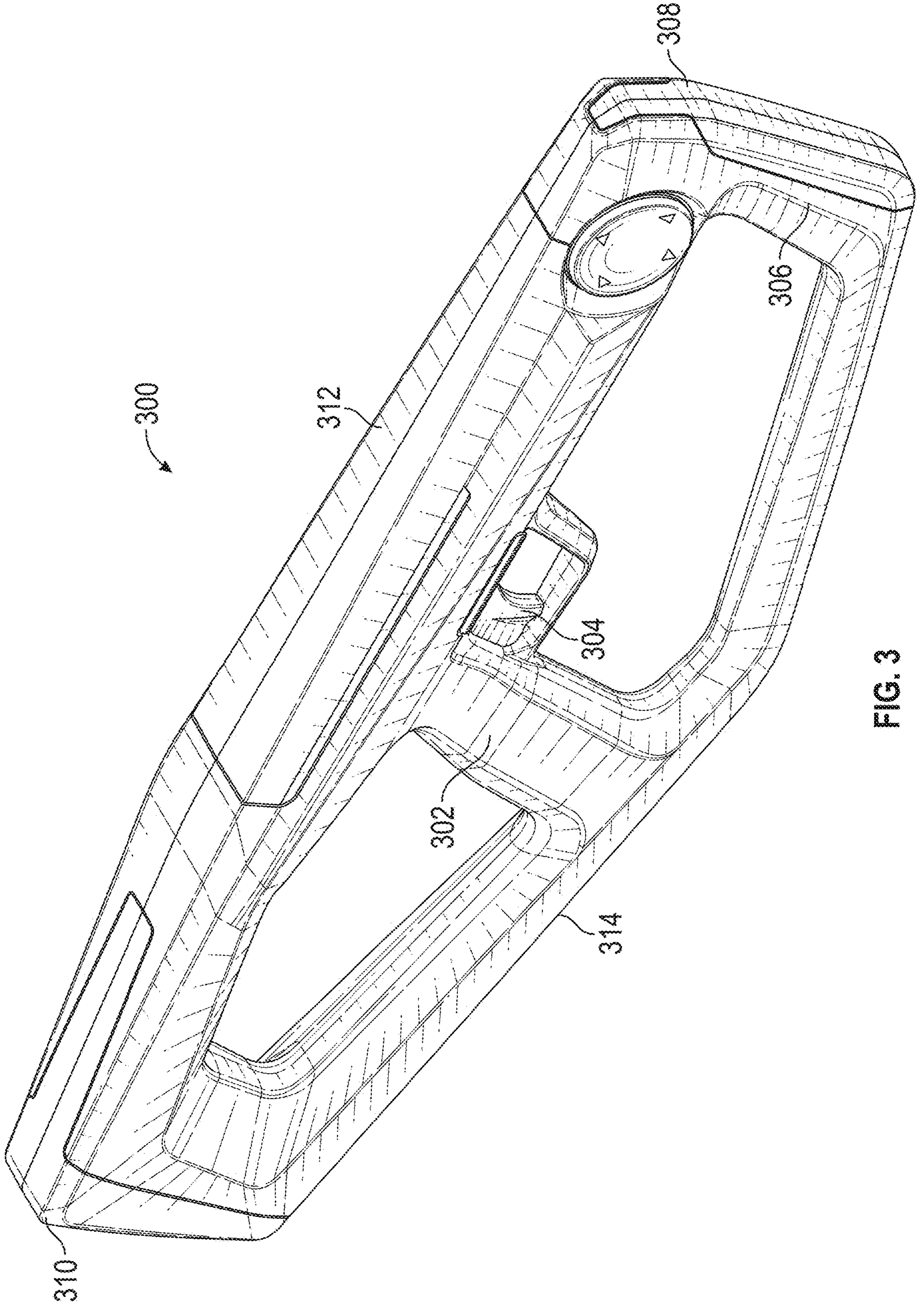
FIG. 3 illustrates a three-dimensional perspective view of a peripheral device including haptic actuators that may be used as a component of a simulation system, according to an embodiment.

FIG. 3 illustrates a three-dimensional perspective view of a first embodiment of a peripheral device 300 including haptic actuators (not shown in this view) that may be used as a component of a simulation system, according to an embodiment. Peripheral device 300 includes a first grip 302 that may be held by a user, a trigger 304 that may be actuated by a finger of the user's hand that holds grip 302, and a second grip 306 that may be held by a user's other hand. Peripheral device 300 may be configured to be sufficiently lightweight so that it may be held using a single hand (i.e., a hand holding first grip 302) or may be held using two hands (e.g., with a first hand on first grip 302 and the second hand on second grip 306). As shown, peripheral device 300 has a front end 308, a back end 310, a top side 312, and a bottom side 314. Peripheral device 300 may be used the way a common rifle or laser tag blaster might be carried or aimed. In this regard, a user may run with, crouch with, or swing peripheral device 300 while in use. Back end 310 of peripheral device 300 may be braced against a user's shoulder (e.g., the way peripheral device 106 in FIG. 1 is braced against a shoulder of user 102).

Figure 4:
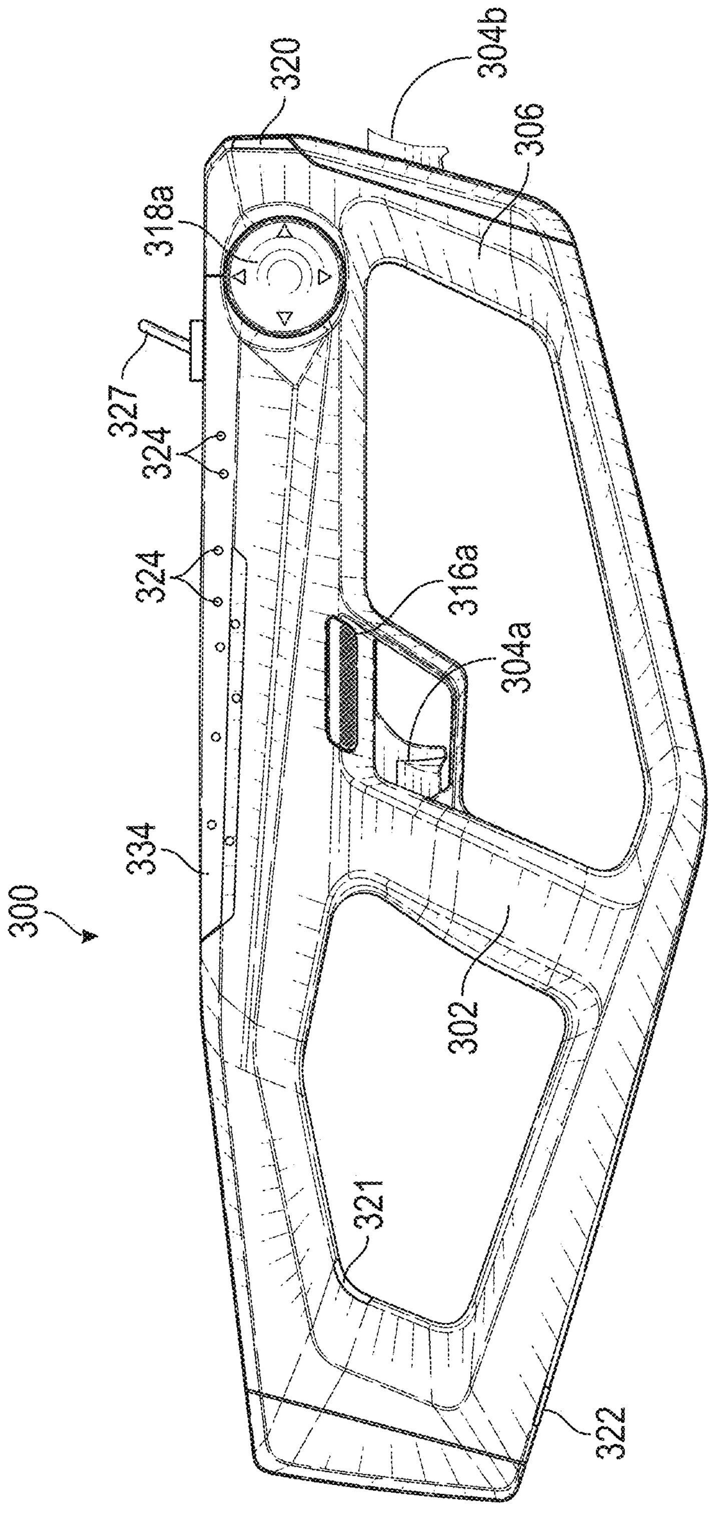
FIG. 4 illustrates a first side view of the peripheral device of FIG. 3, according to an embodiment.

FIG. 4 illustrates a first side view of a second embodiment of a peripheral device 300 FIG. 4 illustrates the right side of peripheral device 300 relative to a user holding peripheral device with front end 308 facing away from the user. Peripheral device 300 includes various user-input devices. For example, in addition to a first trigger 304*a*, peripheral device 300 may include a second trigger 304*b*, right-side buttons 316*a*, a right-side directional touch pad 318*a*, and optional front buttons 320. First trigger 304*a* and side buttons 316*a* may be configured to be manipulated by fingers of a user's first hand that holds first grip 302. Direction touch pad 318*a* and front buttons 320 may be configured to be manipulated by fingers of a user's second hand that holds second grip 306. Peripheral device 300 may further include a power button 321 and one or more USB ports 322. USB port 322 may be used to connect peripheral device 300 to an electrical power source to charge peripheral device 300, which has an electrical energy storage device (e.g., battery or super-capacitor; not shown in this view).

In additional embodiments, peripheral device 300 may contain WiFi, BLE, Bluetooth Classic, or other wireless radios to connect peripheral device 300 to other system components and/or a HMD running the game or simulation. In another embodiment, the game or simulation controller may send haptic signals to be played by peripheral device 300 via a wired or wireless connection to emulate haptic effects associated with various objects and to emulate environmental haptic effects. In another embodiment, computer program instructions representing haptic effects may be downloaded by peripheral device 300. Such program instructions may be stored in various memory locations within peripheral device 300 and may be called/executed on peripheral device 300 in response to a wireless signal received from a simulation or game controller to reduce wireless bandwidth demands. In another embodiment, peripheral device 300 may use Near Field Communication (NFC) to record or store information about or onto the peripheral.

In some embodiments, a detachable external battery (not shown) that plugs into the USB port may be provided. In certain embodiments, peripheral device 300 may be able to charge other USB products via its USB port. Peripheral device 300 may further use internal lithium-ion batteries or similar battery technologies.

In some embodiments the peripheral device 300 may contain an inertial measurement unit (IMU), accelerometer, gyroscope, and/or magnetometer for position sensing or supplemental position sensing of the device.

In the embodiment illustrated in FIG. 4, the peripheral 300 includes a small display screen 327 mounted on a top side of the peripheral 300. The display screen can 327 be used to display various items of information to a user during a simulation or during game play. In some instances the information and/or images presented to the user on the display screen 327 can be generated by a controller mounted within the peripheral 300. In other instances, the information and/or images presented to the user can be generated by a controller that is not mounted within the peripheral 300, such as a controller that is generating a simulation or game in which a user is participating with the peripheral 300. In that instance, video signals could be received by the peripheral 300 via a wired connection or wireless connection and then used to drive the display 327.

User input devices (e.g., first trigger 304*a*, second trigger 304*b*, right-side buttons 316*a*, right-side direction touch pad 318*a*, front buttons 320, etc.) may be used to generate signals that control operation of peripheral device 300. In this regard, circuitry within peripheral device 300 may receive signals generated by actuation of user-input devices and may process and communicate such signals to the controller/computing device (not shown) that generates the virtual reality simulation. Optional front buttons 320 may be configured as menu buttons that, when actuated, may cause a menu to be displayed on an HMD 104 (e.g., see FIG. 1) worn by a user. In one embodiment, directional touchpads 318*a* (and 318*b*, see FIG. 5A) can be used for locomotion within VR. In this way, a user may position a finger in a direction the user wishes to move in the VR simulation and may press the touchpad down to activate the touchpad button.

The provision of first and second triggers 304*a*, 304*b* allows a game or simulation to use signals generated by actuation of the first and second triggers 304*b* in a variety of different ways. In some games or simulations actuation of the first trigger 304*a* would have the effect of firing a first type of offensive weapon, such as a firearm or laser weapon. Actuation of the second trigger 304*b* could be used to fire a different type of offensive weapon, such as a flame thrower or a rocket propelled grenade. In other instances, actuation of the second trigger could be used to control user locomotion or orientation within a virtual simulation or game space. The combinations and uses of trigger actuation signals are limited only by the creativity of the simulation/game designers, but the provision of first and second triggers 304*a*, 304*b* provides a convenient way to cause various effects to happen within a simulation or virtual game space using a finger motion that is well known to users.

As mentioned above, peripheral device 300 may be configured to be lightweight for case of use (e.g., to keep injuries and fatigue to a minimum) and to allow a user to hold peripheral device 300 using one or both hands. For example, peripheral device may be configured to weigh 3 lb. or less. Peripheral device 300 may be rigidly constructed with durable and lightweight materials such that it may be squeezed hard by a user without deformation, especially in regions including grips 302 and 306. Peripheral device 300 may further include a plurality of light emitting diodes (LEDs) 324 that may generate light for use in an optical tracking system.

Peripheral device 300 (e.g., see FIG. 4) may further include a removeable top cover 334 (e.g., see FIG. 11 and related description) that is serviceable by the end-user. Top cover 334 may be used to change the configuration of haptic modules and/or the configuration of embedded tracking technology for different headsets. As shown, top cover 334 may house LEDs 324, photodiodes and/or other tracking devices. LEDs 324 may be similar to IR LEDs used in the Oculus Quest and Oculus Quest 2 hand controller. In other embodiments, LEDs 324 may be similar to the IR LEDs used with the Optitrack tracking system. In a further example, LEDs 324 may be substantially similar to the photodiodes used in the HTC Vive tracking system.

Figure 5A:
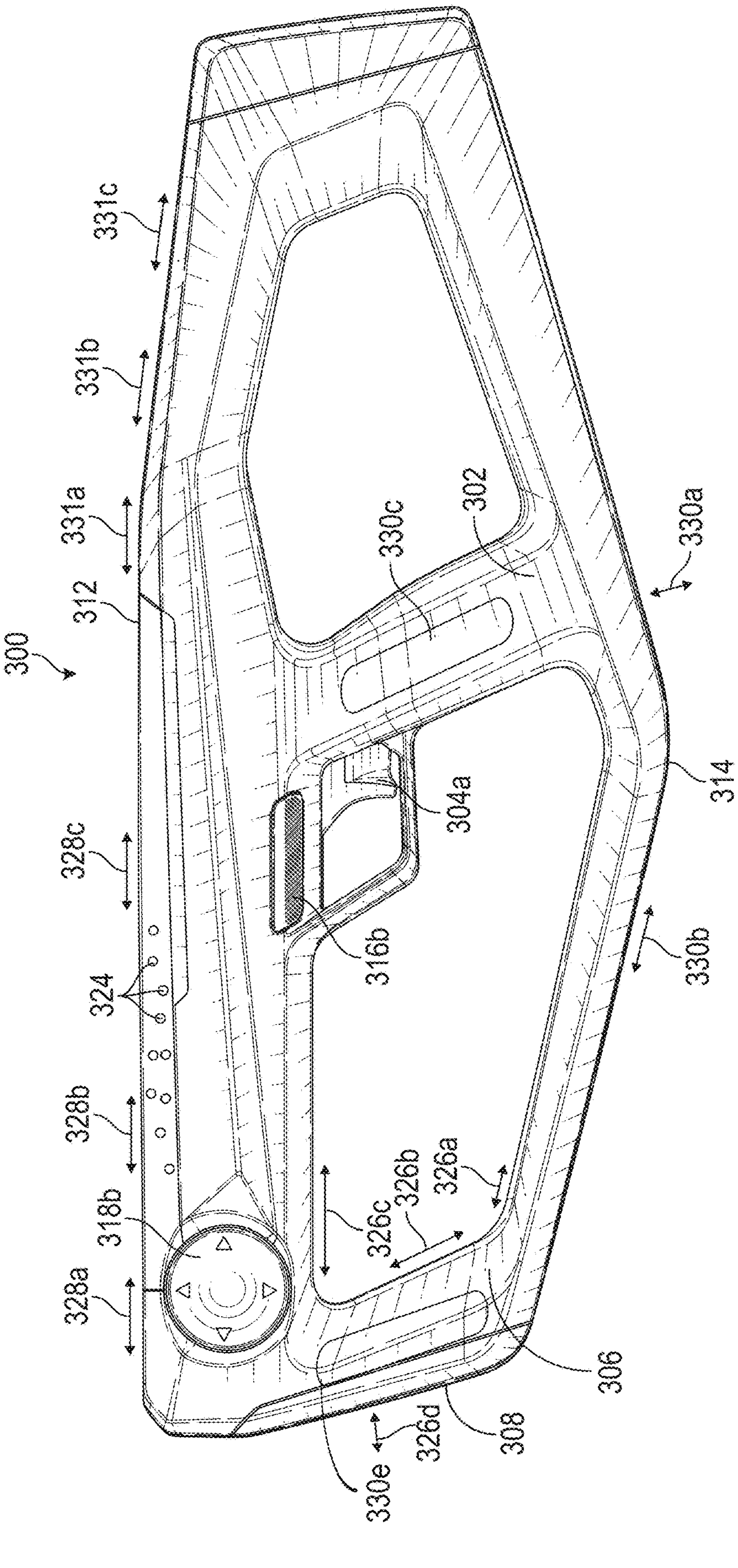
FIG. 5A illustrates a second side view of the peripheral device of FIGS. 3 and 4, according to an embodiment.

FIG. 5A illustrates a side view of another embodiment of a peripheral device 300 FIG. 5A illustrates a left side of the peripheral device 300 relative to a user holding peripheral device with front end 308 facing away from the user. Peripheral device 300 may include left-side buttons 316*b* and a left-side directional touch pad 318*b*. The left side of peripheral device 300 may further include LEDs 324 that may generate light for use in an optical tracking system.

Peripheral device 300 may further include one or more capacitive touch sensors that generate signals in response to a user touching and/or grasping the capacitive sensors. For example, peripheral device 300 may include capacitive touch sensors 326*a* and 326*b* associated with the front grip 306. A further capacitive touch sensor 326*c* may be placed under directional touch pad 318*b*. A capacitive touch sensor 326*d* may further be provided on a front surface of the front grip 306. Capacitive touch sensors 326*a* to 326*d* may be actuated by a user's touch or by motion of a user's finger(s) or hand relative to the capacitive touch sensors 326*a* to 326*d*. Capacitive touch sensors 328*a*, 328*b* and 328*c* may further be provided on a surface of the top side 312 of peripheral device 300. Additional capacitive touch sensors 330*a* and 330*b* may be further placed on a surface of the bottom side 314 of peripheral device 300.

A left side grip capacitive touch sensor 330*c* may be placed on the left side of the first grip 302, with a corresponding right side grip capacitive touch sensor 330*d* (not shown in FIG. 5A) being placed on the right side of the first grip 302. A left side capacitive sensor 330*e* may also be placed on the left side of the second grip 306, with a corresponding right side capacitive grip sensor 330*f* (not shown) being located on the right side of the second grip 306. Capacitive touch sensors (not shown) also could be placed on the first trigger 304*a*, on the right side and/or right side buttons 316*a*, 316*b*, and on various other surfaces of peripheral device 300.

As shown in FIG. 5A, there may be many areas (326*a* to 326*d*, 328*a* to 328*c*, 330*a*, 330*b*, 330*c*, 330*d* and 331*a* to 331*c*) of peripheral device 300 that may be configured to receive capacitive touch input. Capacitive touch sensors may include active capacitive sensing integrated circuits (ICs) as well as capacitive electrodes. Capacitive sensors may be configured to operate as passive or active devices. A given peripheral device (e.g., the peripheral devices 300 of FIGS. 3 to 5A) may include both passive and active capacitive touch sensing devices.

Passive capacitive devices measure capacitive changes to an isolated electrode or electrodes embedded in the body of peripheral 300. With the approach of a user's hand, for example, the capacitance of a particular capacitive sensor undergoes a change which may be detected. The change may thus generate a signal that may represent a distance of a user's hand from a particular sensor.

An active capacitive device may be configured in a similar way to that of a passive capacitive sensor, but may further include an active switching electrode near a measurement electrode. The active switching electrode may be configured to generate a known (e.g., digital) signal that may be generated in response to a detected offset of a capacitive signal that is generated by a user's touch. Active capacitive sensors may offer greater flexibility in terms of stability and may avoid errors associated with environmental effects such as changing humidity and temperature that may introduce unwanted capacitive changes over time.

In some embodiments, the capacitive sensors may also be capable of generating signals that are indicative of the amount of force that a user's hand or finger is applying to the capacitive sensors. Force information may also be useful in various contexts, as explained below.

Capacitive touch sensors may be used during a VR simulation or game experience in many different ways. For example, a user can press a "reload" area (e.g., capacitive touch sensor 330*a* shown in FIG. 5A) to reload a simulated weapon during a game simulation. In another example, the user may slide their hand on the "forward bar grip" (e.g., capacitive touch sensor 300*b*) to initiate a charging or loading of a weapon or other object during a game simulation. In another example, the user can slide their hand on the "under touchpad grip" (e.g., capacitive touch sensor 326*c*) to initiate a charging or loading of a weapon or other object during a game simulation.

To generate realistic interactions between users and the virtual environment, peripheral 300 (e.g., see FIGS. 3 to 5A) may utilize the ability to capacitively sense positions and movements of a user's hands. The sensed positions and movements of the user's hands can then be used to generate a virtual simulation or virtual game space that accurately mimics how the user is moving their hands. This can include providing data for Inverse Kinematic (IK) pose assistance algorithms, and to determine right & left handedness. Game mechanic interactions, such as closing an open lid or pulling a charging handle of a weapon in VR, may be simulated using various hand gestures that actuate capacitive touch sensors to generate corresponding signals, as explained below.

In modern VR simulations/experiences, a right or left handedness determination is largely dictated at the start of a game or simulation by the user's selection via a menu. For example, a user may select whether they are left-handed or right-handed via actuation of one or more sensors or input buttons, during initiation of the game or simulation. With the incorporation of capacitive sensing elements in the right and left sides of the peripheral 300, right or left handedness can be determined by relative differences in detected capacitance associated with a user's finger tips stretching around the grip vs. capacitance associated with a user's palm. Thus, the user no longer has to choose their handedness. Further, the user's handedness can change during game play if the user repositions peripheral device 300 between their hands as shown in FIGS. 5E and 5F. In this example, a user's hands, 506*a* and 506*b*, may be positioned in various ways relative to a peripheral device 508. Handedness determinations can additionally be accomplished via proximity sensors and other sensors (not shown). The ability to perform simple operations like handedness detection can yield a more diverse and enhanced user experience.

More specifically, a left side grip capacitive sensor 330*c* can be provided on a left side of the first grip 302 of the peripheral, with a corresponding right side grip capacitive sensor 330*d* (not shown in FIG. 5A) being provided on the right side of the first grip 302. When a user grasps the first grip 302 with a hand, the signals provided by the right and left side capacitive sensors 330*c*, 330*d* can be used to determine if the user grasped the first grip 302 with the user's right hand or the left hand. For example, if signals from the left side capacitive grip sensor 330*c* indicate there are three or four distinct points of contact with a user's hand, and signals from the right side capacitive grip sensor 330*d* indicate there is only one or only two points of contact with the user's hand, this could be interpreted to mean that the user grasped the first grip 302 with the user's right hand. The reverse pattern of signals could be interpreted to mean that the user grasped the first grip 302 with the user's left hand.

This information about which of the user's hands grasped the first grip 302 can be fed to the controllers that are generating a virtual simulation or a virtual reality game space that is being displayed to the user. As a result, the images being displayed to the user will correctly show the hand the user placed on the first grip 302. Similar right and left side grip capacitive sensors 330*e* and 330*f* could also be placed on the second grip 306, and signals from those grip capacitive sensors 330*e*, 330*f* could be used in a similar way to help determine which of the user's two hands is grasping the second grip 306.

The right and left side capacitive grip sensors 330*c* to 330*f* can also be used to determine when a user is actually grasping the first and second grips 302, 306, and/or when one or both of the user's hands is not in contact with the grips 302, 306. For example, if one or both of the capacitive grip sensors 330*c*, 330*d* on the first grip 302 output signals indicating that the user is grasping the first grip 302 with the user's right hand, and the capacitive grip sensors 330*c* and 330*f* on the second grip 306 output signals indicating that the user is not grasping the second grip 306 with the user's left hand, this means the user is holding only the first grip 302 with the user's right hand. This also indicates the user's left hand is not in contact with the second grip 306, although the user's left hand could be in contact with another portion of the peripheral 300. For example, one of the other capacitive sensors on the left side of the peripheral 300, such as the left side directional touch pad 318B could be reporting contact, presumably with the user's left hand. This type of information, gathered from the capacitive sensors, can be reported to the controllers generating the virtual reality space being presented to the user so that the virtual reality space accurately portrays what the user is doing with his or her hands.

Capacitive grip sensors that determine when each of the user's hands are in contact with the peripheral 300, and which hand is in contact with which portion of the peripheral 300, provide valuable information that can be used to generate an accurate virtual reality space for the user. Prior art devices have attempted to obtain similar information using optical sensors or imaging devices. Often those optical or imaging sensors are placed on a head-mounted-display, or such sensors are placed in the area surrounding the user.

The cost of the optical or imaging sensors to determine user hand placement and user hand actions is far higher than the cost of capacitive touch sensors mounted on various portions of a peripheral. Also, the processing power that must be devoted to deriving information about user hand placement based on the imaging data generated by optical or imaging sensors is far greater than the processing power required to obtain this information from the signals generated by capacitive sensors mounted on the grips and other portions of the peripheral 300. Moreover, using capacitive sensors on the peripheral 300 makes it possible to more rapidly and reliably determine when a user's hand loses contact with the peripheral 300. For all these reasons, the use of capacitive sensors on the body of the peripheral is highly advantageous compared to prior art systems which use optical or imaging sensors to determine user hand placement.

As mentioned above, some capacitive sensors may be capable of generating signals that are indicative of the amount of force that a user's hand or finger applies to the peripheral. When such information is available, signals indicative of the applied pressure or force may also be used by the processors controlling a virtual simulation or virtual game to help accurately portray the simulation or game play.

For example, if a capacitive sensor is configured to detect a user's fingers pressing on one of the grips, the pressure pattern might indicate that one or more of the user's fingers are missing. This information could be taken into account during game play. If the user's forefinger or "trigger" finger is missing, and the user is forced to actuate the trigger with an alternate finger, the peripheral may compensate for that circumstance by requiring less force to depress the trigger.

If the signals received from a capacitive sensor indicate that the force being applied by a user's hand suddenly lessens, this could be indicative of the user preparing to remove a hand from the peripheral to perform a certain function. Thus information could be taken into account during a simulation or game play.

Similarly, if the user is gripping the peripheral very tightly, to the point it will affect how well the user is able to aim, this information could be provided to instructors as part of the information reported at the end of a simulation. The instructors could then inform the user that holding the peripheral with less force is likely to result in improved aim.

The foregoing are just a few ways in which pressure or force information could be used to help conduct a simulation or game play and how such information could be used to provide feedback to a user. Force or pressure information could also be used in a variety of other ways for similar or alternate purposes.

Figure 5B:
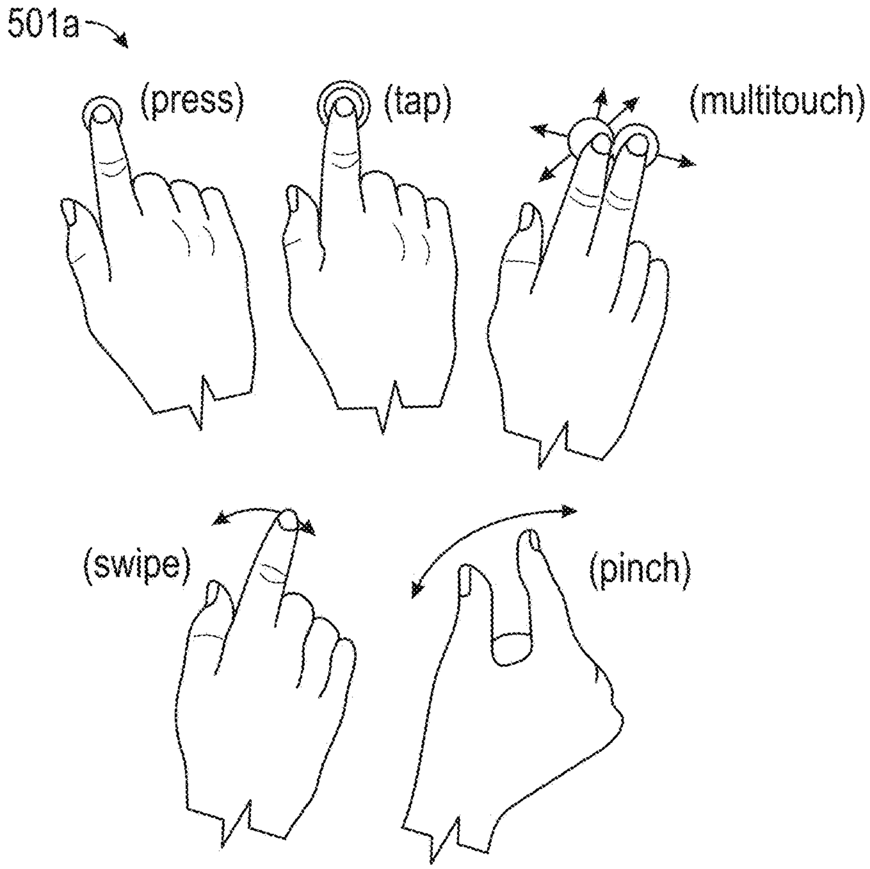
FIG. 5B illustrates a first hand gesture that may be used to actuate capacitive touch sensors of FIG. 5A, according to an embodiment.
Figure 5C:
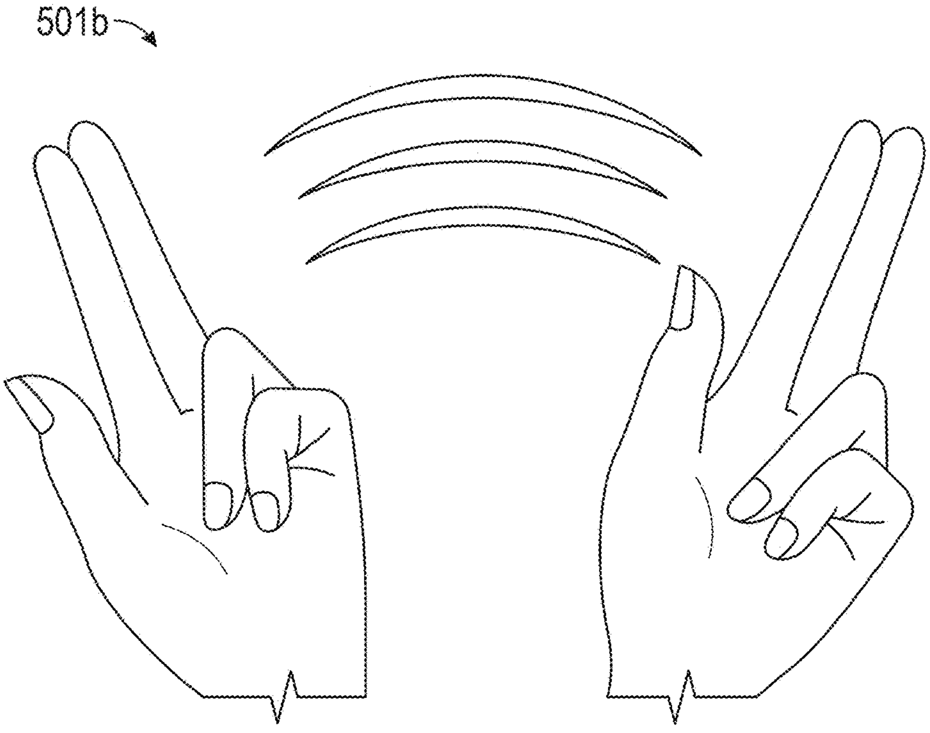
FIG. 5C illustrates a second hand gesture that may be used to actuate capacitive touch sensors of FIG. 5A, according to an embodiment.
Figure 5D:
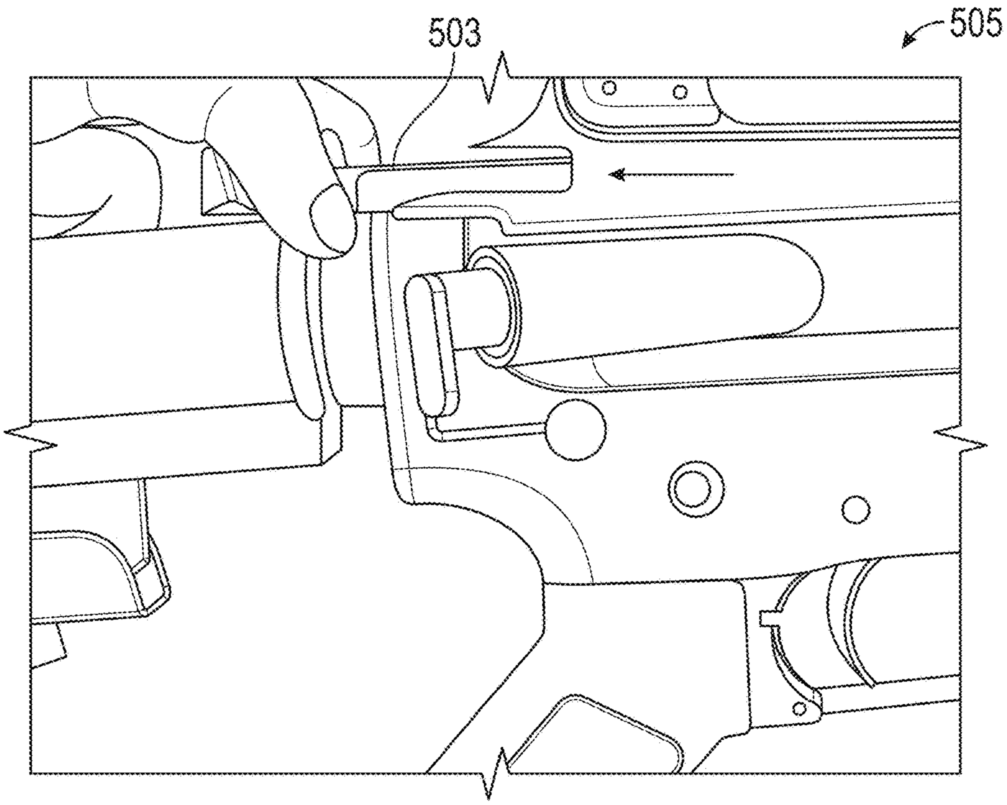
FIG. 5D illustrates an emulated firearm and an action of pulling a charging handle of the emulated firearm, according to an embodiment.
Figure 5E:
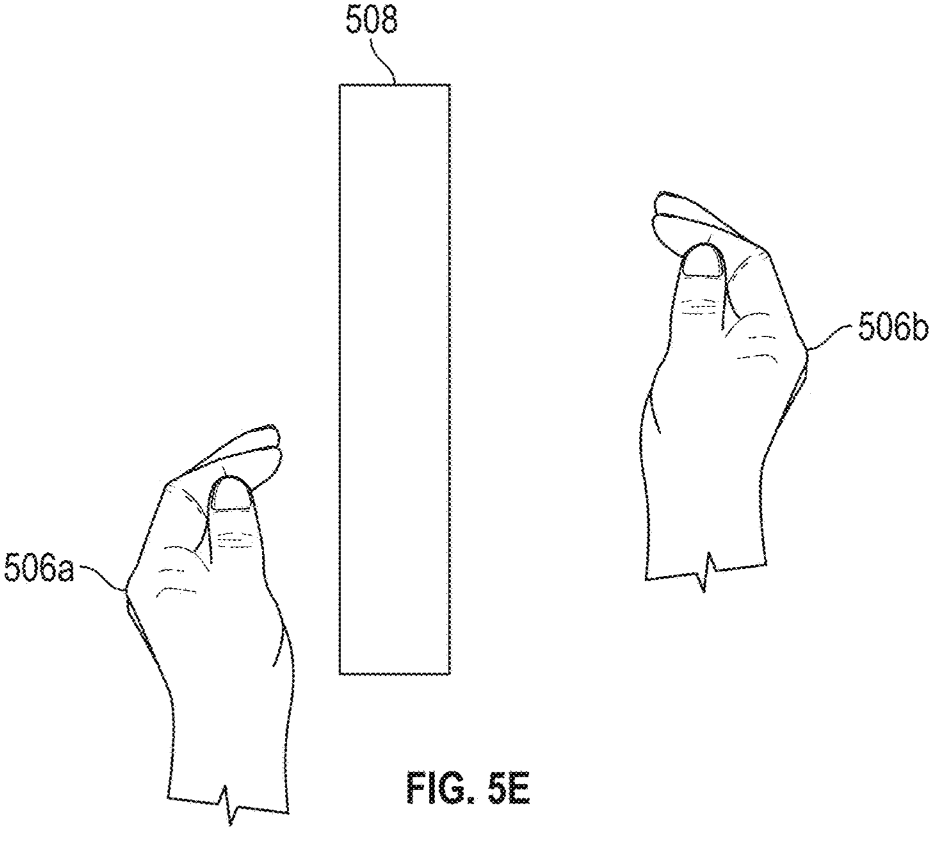
FIG. 5E illustrates a third hand gesture that may be used to actuate capacitive touch sensors of FIG. 5A, according to an embodiment.
Figure 5F:
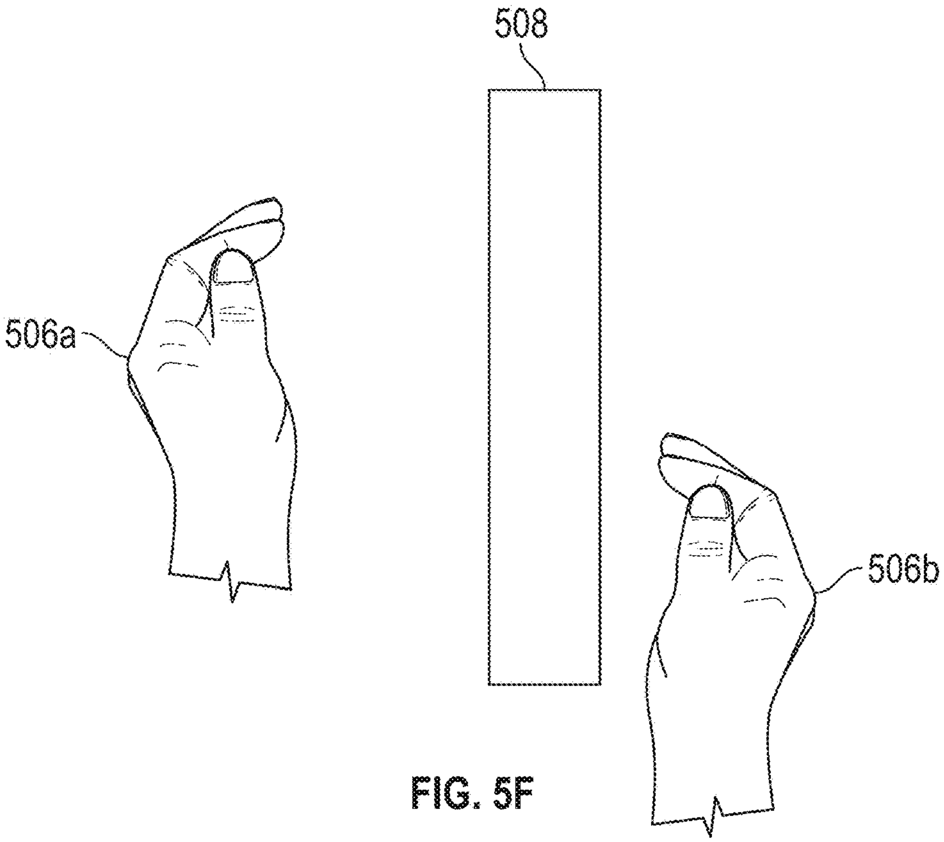
FIG. 5F illustrates a fourth hand gesture that may be used to actuate capacitive touch sensors of FIG. 5A, according to an embodiment.

FIGS. 5B and 5C illustrate hand gestures, 501*a* and 501*b*, that may be used to actuate capacitive touch sensors (e.g., capacitive touch sensors 326*a* to 326*d*, 328*a* to 328*c*, 330*a*, 330*b*, and 331*a* to 331*c*) on peripheral device 300 to emulate object interactions. For example, passive electrodes 331*a*, 331*b*, and 331*c* (e.g., shown in the top-right of FIG. 5A) may be used to emulate pulling an in-game charging handle 503 on a rifle 505, as shown in FIG. 5D. In this regard, a user in a VR simulation may see rifle 505 rather than the actual object (e.g., peripheral 300) that they are holding. While no spring force would be felt by the user in this example, within a game simulation, the charging handle could be emulated and "pulled" as depicted in FIG. 5D. In this way, a user may slide their fingers along the top-right of peripheral device 300, to thereby actuate one or more capacitive touch sensors 331*a* to 331*c*, as shown in FIG. 5A. In another embodiment, haptic actuators may provide feedback to the user during the sliding of their fingers to "pull" the charging handle 503 or rifle 505 to provide a greater immersion experience to the user.

The interactions with a peripheral device, shown in FIGS. 5B TO 5F, allow a user to manipulate objects in VR in much the same ways that one may manipulate corresponding objects in real life. The ability to see changes in the virtual world, caused by emulated manipulation of objects, greatly adds to the depth of the user's experience. In another example, a user's non-dominate hand may be animated, in-game, based on interaction with the "under touchpad grip" (e.g., capacitive touch sensor 326*c* shown in FIG. 5A) the "front handgrip face" (e.g., capacitive touch sensor 326*d*) and "forward bar grip/front handgrip" (e.g., capacitive touch sensor 326*a* and 326*b*). Other embodiments may incorporate other sensors such as proximity sensors that use the reflection of a light source to sense objects.

An additional immersion experience may include the user being able to fully see the animated motion of their representative hands in the VR game or simulation when touching the body of peripheral device 300 (e.g., see FIGS. 3 to 5A). In another embodiment, capacitive sensing may detect the distance of a hand and animate the sensed hand as well. IK pose assistance may be additionally furthered when there are only two objects being tracked. For example, there are IK systems that can animate the body of a VR user based on a known position of an HMD relative to the ground and based on a known position of the peripheral device relative to the HMD.

These systems are based on IK algorithms that make use of information regarding likely movements and movement profiles of a user holding a known peripheral. Conventional use of IK algorithms, however, have certain limitations regarding situations in which the VR user is being viewed in-game by other VR users. In this regard, what other VR users can see is usually limited based on the ability of HMDs to track the user's body. Generally additional trackers that would improve IK algorithms are not used because of cost limitations. Further, IK systems employed for consumer VR systems may have limited data capacity. These limitations may negatively affect the experiences of other VR users that are viewing the user of peripheral device 300 (e.g., see FIGS. 3 to 5A). For example, shortcomings of IK systems may lead to breaking immersion when a user's body may be improperly animated or may be removed altogether from the VR simulation, such as when the simulation shows only the user's head and/or peripheral device 300.

Improved IK algorithms may benefit from information provided by capacitive touch sensing along the peripheral's body (e.g., such through use of capacitive touch sensors 326*a* to 326*d*, 328*a* to 328*c*, 330*a*, 330*b*, 331*a* to 331*c* in FIG. 5A). In this regard, capacitive touch sensors may provide information regarding hand placement and gestures that may be detected by one or multiple capacitive touch sensors. Such information may be used to define bounds of IK algorithms to thereby give greater fidelity to proper tracking and animation of a user's body during a VR simulation. In this regard, likely body poses may be determined based on known sensor locations on the peripheral body including predetermined touchpoints that a user may touch (i.e., where the user holds onto or touches the peripheral device) to actuate sensors to emulate in-game objects.

Figure 5G:
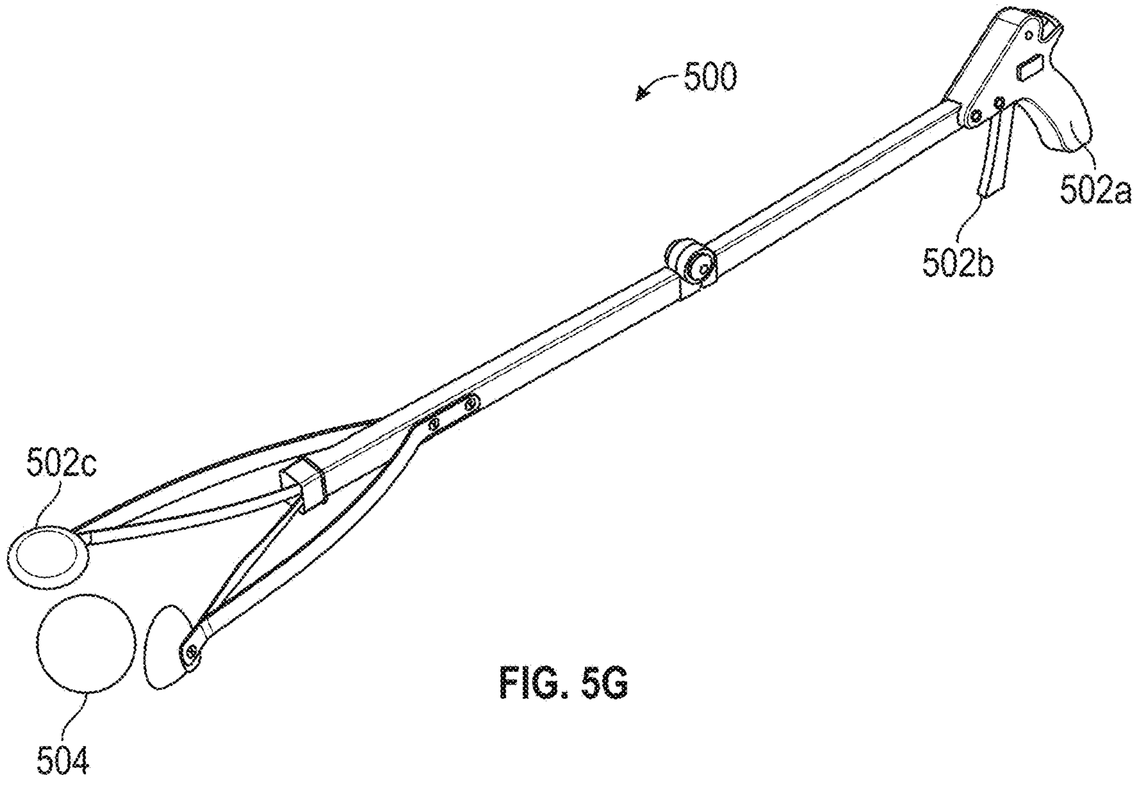
FIG. 5G illustrates an emulated device in the form of a grabber, according to an embodiment.

FIG. 5G illustrates an emulated object 500 as it may be seen to a user during a VR simulation, according to an embodiment. In this example, a user holding and operating peripheral device 300 (e.g., see FIG. 3) may see an object that looks like a "grabber" 500 as shown in FIG. 5G. In this example, grabber 500 of FIG. 5G includes three separate components 502*a*, 502*b*, and 502*c*, and one object 504. Component 502*a* is a handgrip of grabber 500 and in a realistic VR simulation, this component can feel the same or substantially similar to the first grip 302 of peripheral device 300 shown in FIG. 3. As such, the user may perceive a visual and tactile experience of actually holding the handgrip 502*a* of grabber 500 of FIG. 5G. In a simulation, component 502*b* may be a trigger of grabber 500 that manipulates closure of component 502*c*, so that grabber 500 may close on object 504 to thereby grip object 504.

Object 504 may be any emulated object, such as a piece of balled up paper, an aluminum can, a solid piece of metal, etc. Any given object 504 may have specific representative elasticities and forces necessary for deformation. For example, a balled-up piece of paper representing object 504 will deform easily when squeezed by component 502*c* via the user's input on the trigger in component 502*b*. An aluminum can, as represented by object 504, also may be relatively easy to squeeze but may be permanently deformed as a result of interaction with component 502*c* of grabber 500. Deformation forces may be translated to the trigger in 502*b* as the user squeezes and thereby crushes the aluminum can. Once deformed, picking up object 504 a second time (e.g., an aluminum can that has been deformed) may require a longer squeeze of trigger 502*b*, due to the deformation of object 504.

Different forces would be required to pick up object 504 in the case in which emulated object 504 is represented as a solid piece of metal. In this regard, a solid piece of metal would require much greater forces to generate any appreciable deformation of object 504. As such, a user actuating trigger 502*b* would experience different forces in grasping a solid piece of metal relative to other objects described above. The linkage between components 502*b* and 502*c* may contain some elasticity as the user squeezes the trigger in 502*b*, but the metal object would essentially stay undeformed. As such, greater forces would be transmitted to component 502*b* while the user squeezes the solid piece of metal, and the only elasticity perceived by the user would be associated with linkages between components 502*b* and 502*c*.

An adaptive trigger 304, as described below with reference to FIG. 12 may be configured to generate variable resistance to simulate elasticities associated with various objects (described above) that may be manipulated by grabber 500 during a VR simulation. Such an adaptive trigger may allow variable forces to be emulated on the peripheral as the user squeezes the trigger. In this way, a user feels realistic forces appropriate to a particular object being emulated. Such realistic forces enhance the immersion and depth of experience that a user perceives in the VR simulation such that the peripheral device they are holding (e.g., peripheral device 300 of FIGS. 3 to 5A) looks and feels like an emulated device in VR (e.g., grabber 500 of FIG. 5G).

An adaptive trigger may additionally emulate mechanical effects of other objects such as weapons. For example, different weapons may exhibit different mechanical properties and linkages during firing, out-of-ammo, and charged states. During a firing operation, an adaptive (i.e., force feedback) trigger may push on the user's finger to emulate the mechanism and force that occurs on a real weapon during use. The out-of-ammo state on different weapons can have different mechanical effects. For example, when a user expends the last round of ammunition, the trigger can fall all the way back and thereby lack the resistance normally felt when a round is loaded in the chamber of a weapon.

Additionally, in a charged state (i.e., when the weapon has a round in the chamber) the trigger can undergo a force change as the trigger is pulled. For example, with the weapon charged, the trigger may initially require a high force to move the trigger, but as the trigger is pulled backwards, the force on the trigger may change to emulate a low force or slippage of the trigger that may occur with a real weapon when the weapon is fired.

An adaptive trigger may further emulate other forces that may be associated with other objects that are not limited to real-world objects such as weapons that simulate realistic gunfire. Such objects may emulate weapons that may not exist in real life, including laser-guns, plasma rifles, portal guns, crossbows, etc. Unique force feedback effects associated with such fictional weapons may be designed by developers of game content.

Figure 6:
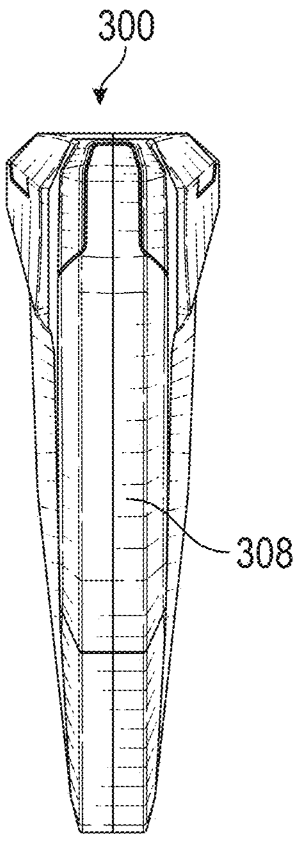
FIG. 6 illustrates a first end view of the peripheral device of FIGS. 3 to 5, according to an embodiment.
Figure 7:
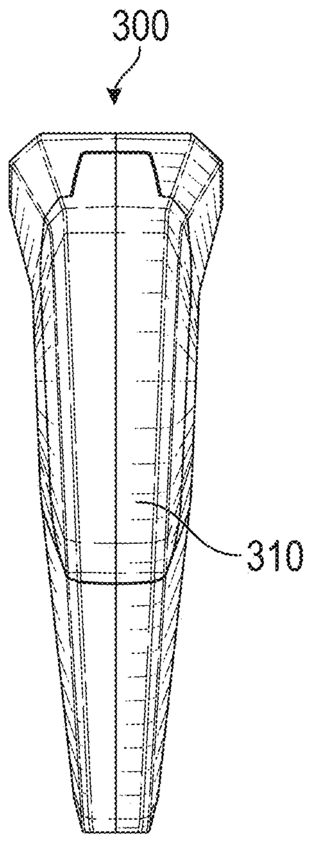
FIG. 7 illustrates a second end view of the peripheral device of FIGS. 3 to 6, according to an embodiment.

FIGS. 6 and 7 illustrate respective end views of peripheral device 300, of FIGS. 3 to 5, according to an embodiment. In this regard, FIG. 6 shows a view looking toward the front end 308 of peripheral device 300, while FIG. 7 shows a view looking toward the back end 310 of peripheral device 300.

Figure 8:
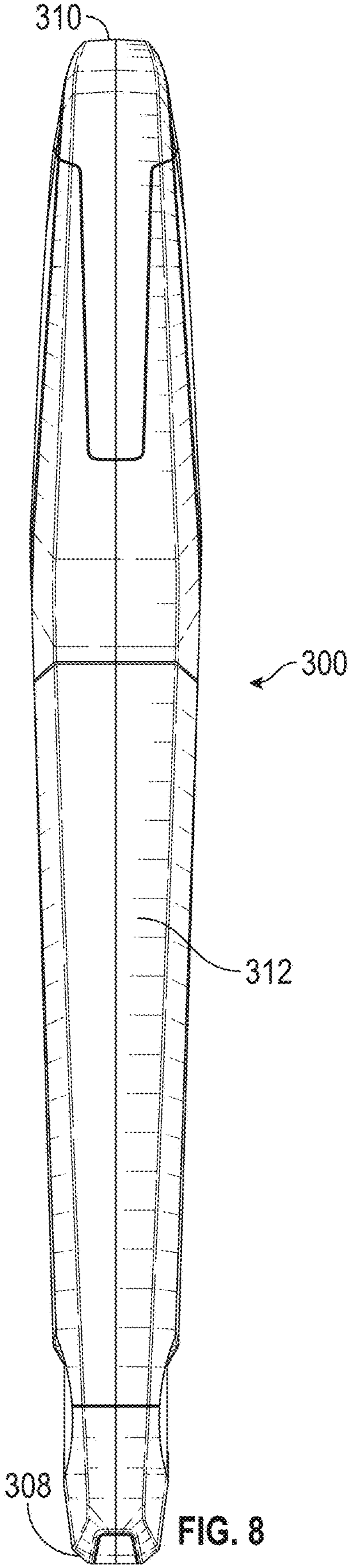
FIG. 8 illustrates a top view of the peripheral device of FIGS. 3 to 7, according to an embodiment.
Figure 9:
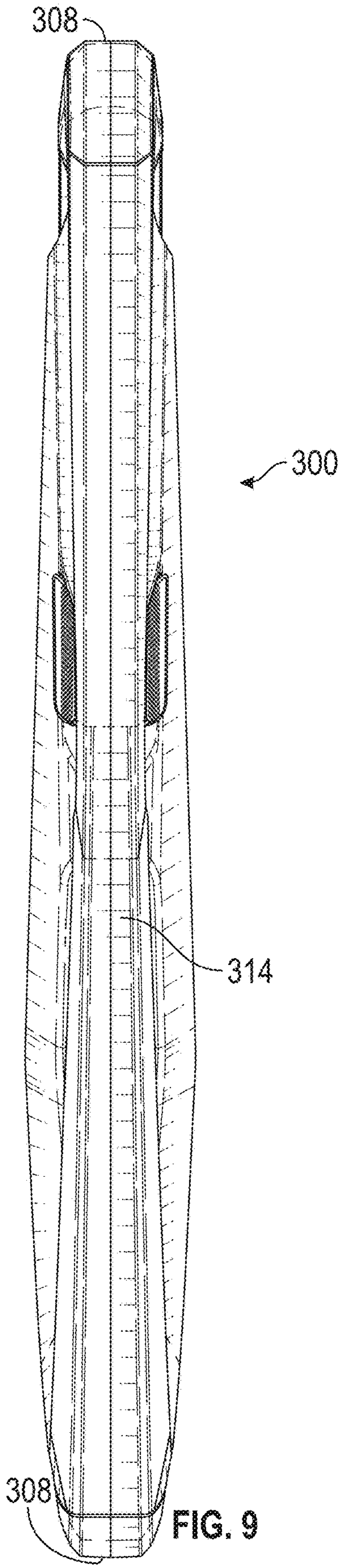
FIG. 9 illustrates a bottom view of the peripheral device of FIGS. 3 to 8, according to an embodiment.

FIGS. 8 and 9 respectively illustrate top and bottom views of peripheral device 300, of FIGS. 3 to 7. In this regard, FIG. 8 illustrates a view looking toward the top end 312 of peripheral device 300, in a configuration in which peripheral device 300 is oriented with its back end 310 located in the top of FIG. 8, while its front end 308 is located in the bottom of in FIG. 8. FIG. 9 illustrates a view looking toward the bottom end 314 of peripheral device 300 in a configuration in which peripheral device 300 is oriented with its front end 308 located in the top of FIG. 9, while its back end 310 is located in the bottom of FIG. 9.

Figure 10:
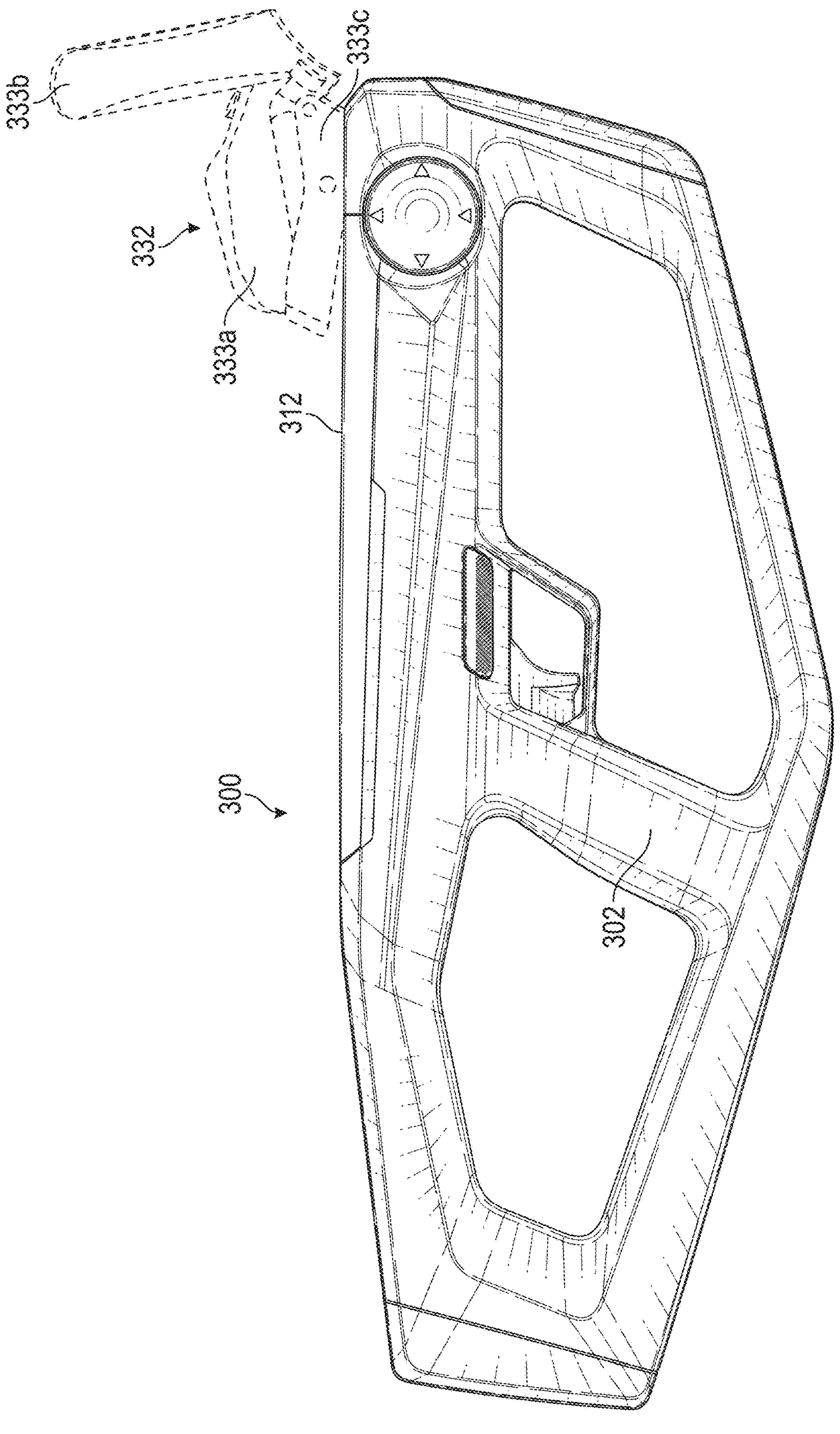
FIG. 10 illustrates a side view of the peripheral device of FIGS. 3 to 9 with a removable tracking device, according to an embodiment.

FIG. 10 illustrates a side view of peripheral device 300 with a removable tracking device 332, according to an embodiment. In this example, a right-side view (e.g., see FIG. 4) of peripheral device 300 is shown. Tracking device 332 may include an HMD controller associated with a particular HMD. In an example embodiment, the system may include an Oculus Quest HMD (not shown) and tracking device 332 may include the corresponding controller 333*b* (i.e., a "tracking puck") for the Oculus Quest HMD. Peripheral device 300 may be configured with mounting holes (not shown) on a surface of the top end 312 of peripheral device 300. In this way, tracking device 332 may be removably mounted to peripheral device 300, via a mounting device 333*a* and 333*c*. In this example, peripheral device 300 may be configured to have its center-of-gravity passing through grip 302, wherein the center-of-gravity arises due to a mass distribution of components internal to peripheral device 300 as well as a mass distribution associated with tracking device 332. In other embodiments, peripheral device 300 may be provided with an internally-mounted tracking device. In such embodiments, a removable device, such as tracking device 332, would not be needed.

Figure 11:
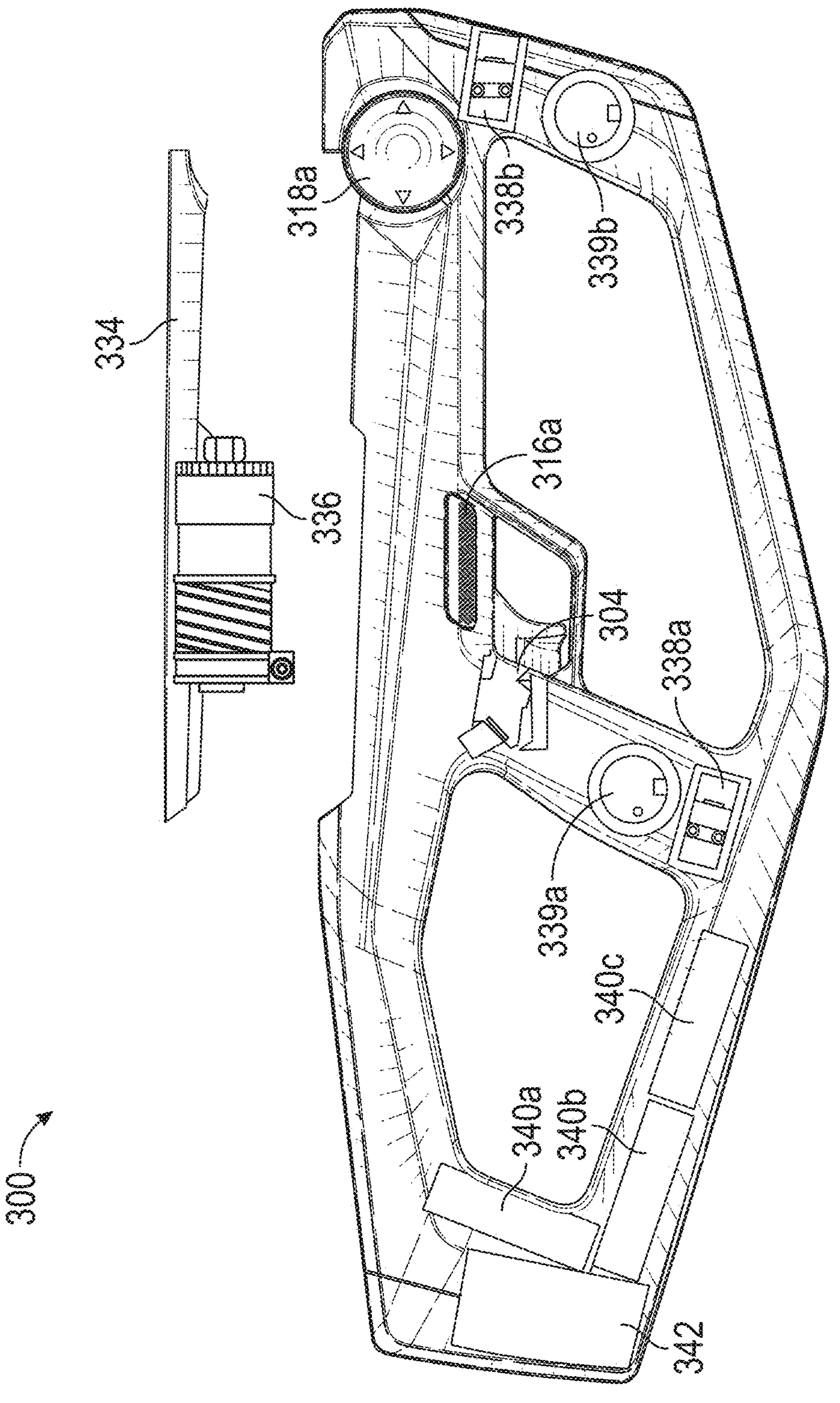
FIG. 11 illustrates side cross-sectional view of the peripheral device of FIGS. 3 to 10, according to an embodiment.

FIG. 11 illustrates side cross-sectional view of peripheral device 300, according to an embodiment. In this example, peripheral device 300 may include a removable cover 334. As shown, cover 334 may be configured to house a first haptic actuator 336. Upon installation of removable cover 334, haptic actuator 336 may be configured to make electrical connections with an internal common electrical connector (not shown) that may be configured to supply electrical power and control signals to haptic actuator 336. Peripheral device 300 may further include additional haptic actuators 338*a*, 339*a*, 338*b*, and 339*b*.

In an example, haptic actuators 336, 338*a*, 339*a*, 338*b*, and 339*b* may be linear resonant actuators (LRA)s, eccentric rotating mass (ERM) motors, piezoelectric actuators, linear motors, etc. In various examples, haptic actuators may be provided in substantially different orientations and placements from those illustrated in FIG. 11. A common connector may be configured to connect different types and sizes of actuators as well as contain different tracking technologies. As such, peripheral device 300 (e.g., see FIGS. 3 to 5A) may be reconfigurable to enable the user to modify the haptics and systems that are configured to work with peripheral device 300. In another example, the common connector can contain additional electrodes that can be connected in different patterns with the connector on the removeable top cover 334. In this way, peripheral device 300 may be reconfigurable by changing from one removable top cover, which provides a first type of functionality, to another top cover, which provides a second type of functionality.

Peripheral device 300 may include energy storage devices 340*a*, 340*b*, and 340*c*. Energy storage devices 340*a* to 340*c* may be batteries, super-capacitors, or any other suitable energy storage devices. Peripheral device 300 may further include control circuitry 342. For example, control circuitry 342 may be a printed circuit board assembly (PCBA) having a USB-C port that allows power delivery and data transfer. Control circuitry 342 may be electrically connected to energy storage devices 340*a* to 340*c*, to haptic actuators 336, 338*a*, 339*a*, 338*b*, and 339*b*, to first trigger 304*a* and second trigger 304*b*, to side buttons 316*a* and 316*b* (e.g., see FIG. 5), to direction touch pads 318*a* and 318*b* (e.g., see FIG. 5), to LEDs 324 (e.g., see FIGS. 4 and 5), and to various capacitive sensors (e.g., capacitive sensors 326*a* to 326*d*, 328*a* to 328*c*, 330*a*, 330*b*, 330*c*, 330*d*, 330*c*, 330*f* of FIG. 5), via various electrical circuits (not shown).

Figure 12:
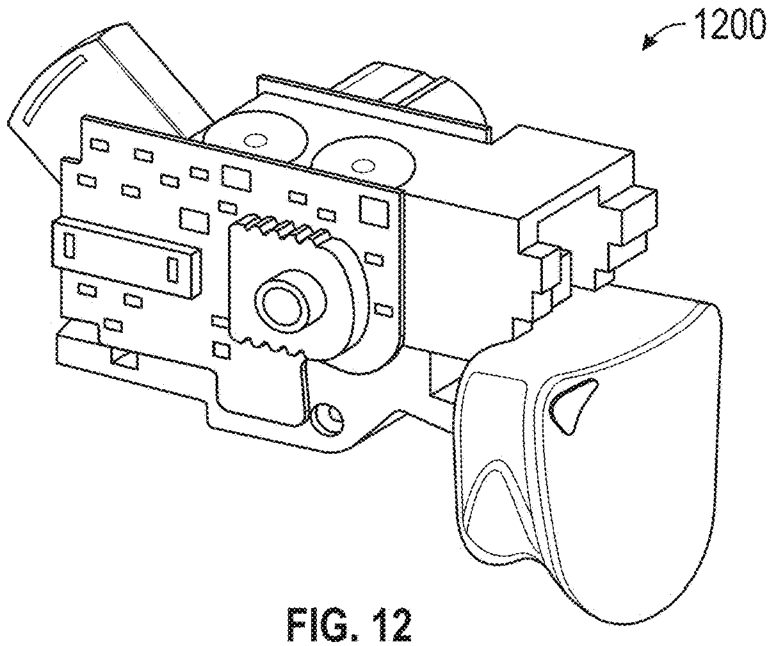
FIG. 12 illustrates an example adaptive trigger that may be used as a component of the peripheral device of FIGS. 3 to 11, according to an embodiment.
Figure 13A:
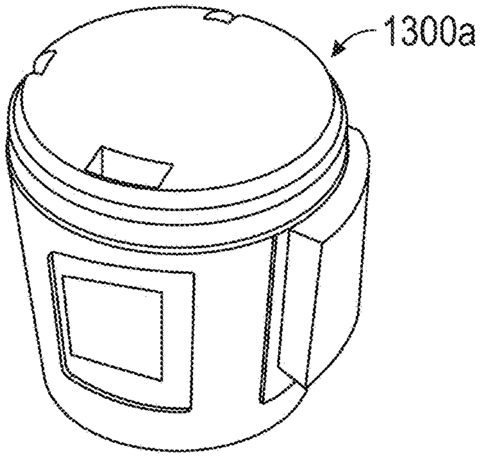
FIG. 13A illustrates a first example haptic actuator that may be used as a component of the peripheral device of FIGS. 3 to 11, according to an embodiment.
Figure 13B:
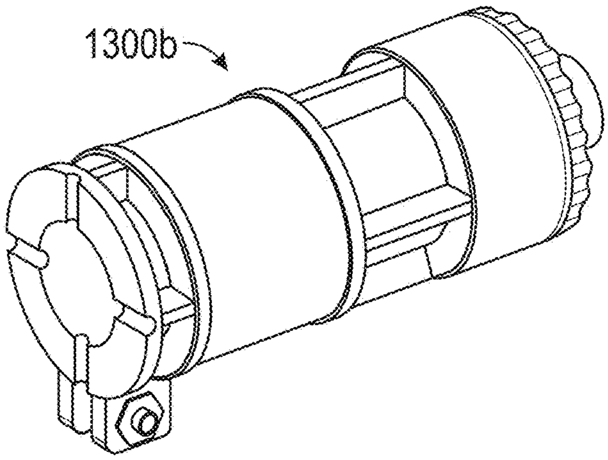
FIG. 13B illustrates a second example haptic actuator that may be used as a component of the peripheral device of FIGS. 3 to 11, according to an embodiment.
Figure 13C:
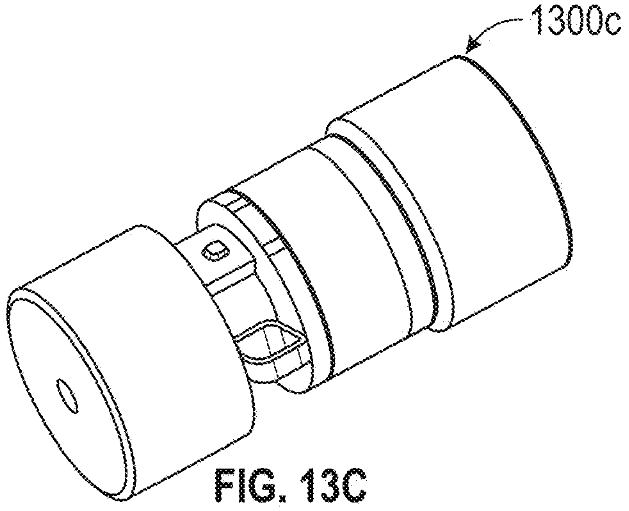
FIG. 13C illustrates a third example haptic actuator that may be used as a component of the peripheral device of FIGS. 3 to 11, according to an embodiment.

FIGS. 12 to 13C show various other components that may be included in peripheral device 300 of FIGS. 3 to 11, according to various embodiments. In this regard, FIG. 12 illustrates an example adaptive trigger 1200 (designed by Sony Corporation), that may be used as trigger 304 (e.g., see FIGS. 3 to 5 and 11) in peripheral device 300. Other embodiments may include various other adaptive triggers. An adaptive trigger 1200 may be configured to include a haptic actuator (not shown) that is configured to actively respond to a user as the user actuates the trigger. For example, a haptic actuator associated with adaptive trigger 1200 may generate forces or vibrations that resist a user as the user exerts a force on adaptive trigger 1200. FIGS. 13A to 13C show examples of haptic actuators. FIG. 13A illustrates a Foster/PS5 actuator 1300*a*. FIGS. 13B and 13C respectively illustrate a Huron TacHammer actuator 1300*b* and a Carlton TacHammer actuator 1300*c*. Other embodiments may include many other different types of adaptive triggers and haptic actuators.

Table 1, below, illustrates energy demands for two example embodiments under low, medium, and high energy demand conditions.

TABLE 1

| Energy Demand | | |
|---|---|---|
| | First embodiment | Second embodiment |
| (HIGH) | 65.0 W | 16 W |
| (MID) | 4.5 W | 4.8 W |
| (LOW) | 3 W | 3.3 W |
| Estimated Runtime | 68+ Minutes | 208+ Minutes |

Table 2, below, illustrates battery and charging specifications for the two embodiments described above in Table 1.

TABLE 2

| Battery<br>All Variants<br>(3) Li-Ion 18650 Cells 3500 mAh | |
|---|---|
| Charger Type | USB PD |
| Charger Wattage | 65 W |
| Time to Charge | 1 Hour or Less |

Table 3, below, illustrates haptic longevity for the two embodiments described above with reference to Table 1.

TABLE 3

| Haptic Longevity | | | |
|---|---|---|---|
| First embodiment | | Second embodiment | |
| 20M Cycles | (1) Adaptive Trigger | 20M Cycles | (1) Adaptive Trigger |
| ~ | (2) Foster/PS5 Actuators | ~ | (2) Foster/PS5 Actuators |
| 50M Cycles | (1) Huron TacHammer Actuator | 10M Cycles | (2) Carlton TacHammer Actuators |

Table 4, below, describes longevity of input/external connectors.

TABLE 4

| Input/External Connector Longevity<br>All Variants | | |
|---|---|---|
| 5-10M Cycles | (1) Adaptive Trigger (resistive positioning element) | Alps Alpine (RDC506018A) Rotary Resistive Sensor (10k) |
| 5-10M Cycles | (2) Side Buttons | ~ |
| 5-10M Cycles | (2) Touchpad Buttons | ~ |
| 5-10M Cycles | (1) Power Button | ~ |
| 5-10M Cycles | (2) Optional Buttons | ~ |
| ~ | (All) Capacitive Input | ~ |
| ~10,000 Cycles per USB standard | (1) USB-C Port | ~ |

The above-described haptic actuators may include one or more solenoid coils or voice coils. A solenoid is a coil wound into a tightly packed helix. The term solenoid refers to a long, thin loop of wire, often wrapped around a metallic core, which produces a magnetic field when an electric current is passed through it. The term solenoid refers to a coil designed to produce a uniform magnetic field in a volume of space (where some experiment might be carried out). In engineering, the term solenoid may also refer to a variety of transducer devices that convert energy into linear motion. The term is also often used to refer to a solenoid valve, which is an integrated device containing an electromechanical solenoid which actuates either a pneumatic or hydraulic valve, or a solenoid switch, which is a specific type of relay that internally uses an electromechanical solenoid to operate an electrical switch. For example, electromechanical solenoid may be an automobile starter solenoid or a linear solenoid.

Electromechanical solenoids include an electromagnetically inductive coil, wound around a movable steel or iron slug (termed the armature). The coil may be shaped such that the armature may be moved in and out of the center, altering the coil's inductance and thereby becoming an electromagnet. The armature may be used to provide a mechanical force to some mechanism (such as controlling a pneumatic valve). Although typically weak over anything but very short distances, solenoids may be controlled directly by a controller circuit, and thus have very low reaction times. The force applied to the armature is proportional to the change in inductance of the coil with respect to the change in position of the armature, and the current flowing through the coil (according to Faraday's law of induction). The force applied to the armature will always move the armature in a direction that increases the coil's inductance. The armature may be a ferromagnetic material. A voice coil generally has similar corresponding structure to that of a solenoid; however, a voice coil has a magnetic armature, and thus, its position may be reversed by reversing the direction in which current flows through the coil.

According to an embodiment, a peripheral device (e.g., peripheral device 300 of FIGS. 3 to 11) may include a housing facade unit having a plurality of different spaced apart positional locations in the housing facade unit for receiving and holding one or more haptic actuators (e.g., haptic actuators 336, 338*a*, 339*a*, 338*b*, and 339*b* of FIG. 11) and controllable weight units (not shown). In various embodiments the positional locations may be selectable by a user. In another embodiment, a housing facade unit may be provided having a plurality of different angular orientations for receiving and holding one or more haptic actuators and controllable weight units. In various embodiments, the angular orientations may be selectable by a user.

Haptic actuators (e.g., haptic actuators 336, 338*a*, 339*a*, 338*b*, and 339*b* of FIG. 11) may be configured to generate reaction forces on peripheral device 300 of FIGS. 3 to 11. In this regard, when trigger 304 is pulled, control circuitry 342 may cause haptic actuators 336, 338*a*, 339*a*, 338*b*, and 339*b* to create reaction forces which may be transmitted to a user holding peripheral device 300, which may be configured to simulate a firearm body. The reaction forces created by haptic actuators 336, 338*a*, 339*a*, 338*b*, and 339*b* may be controlled to generate a recoil force/impulse for particular ammunition being simulated as being fired from the firearm being simulated. Recoil may be thought of as the forces that a firearm imparts to the user firing the firearm. Such recoil forces may be dependent on the size and construction of the firearm, along with the characteristics of a bullet being fired from the firearm. The recoil imposed on a user of the same firearm may be different when the firearm fires a first type of ammunition compared to a second type of ammunition.

Figure 14:
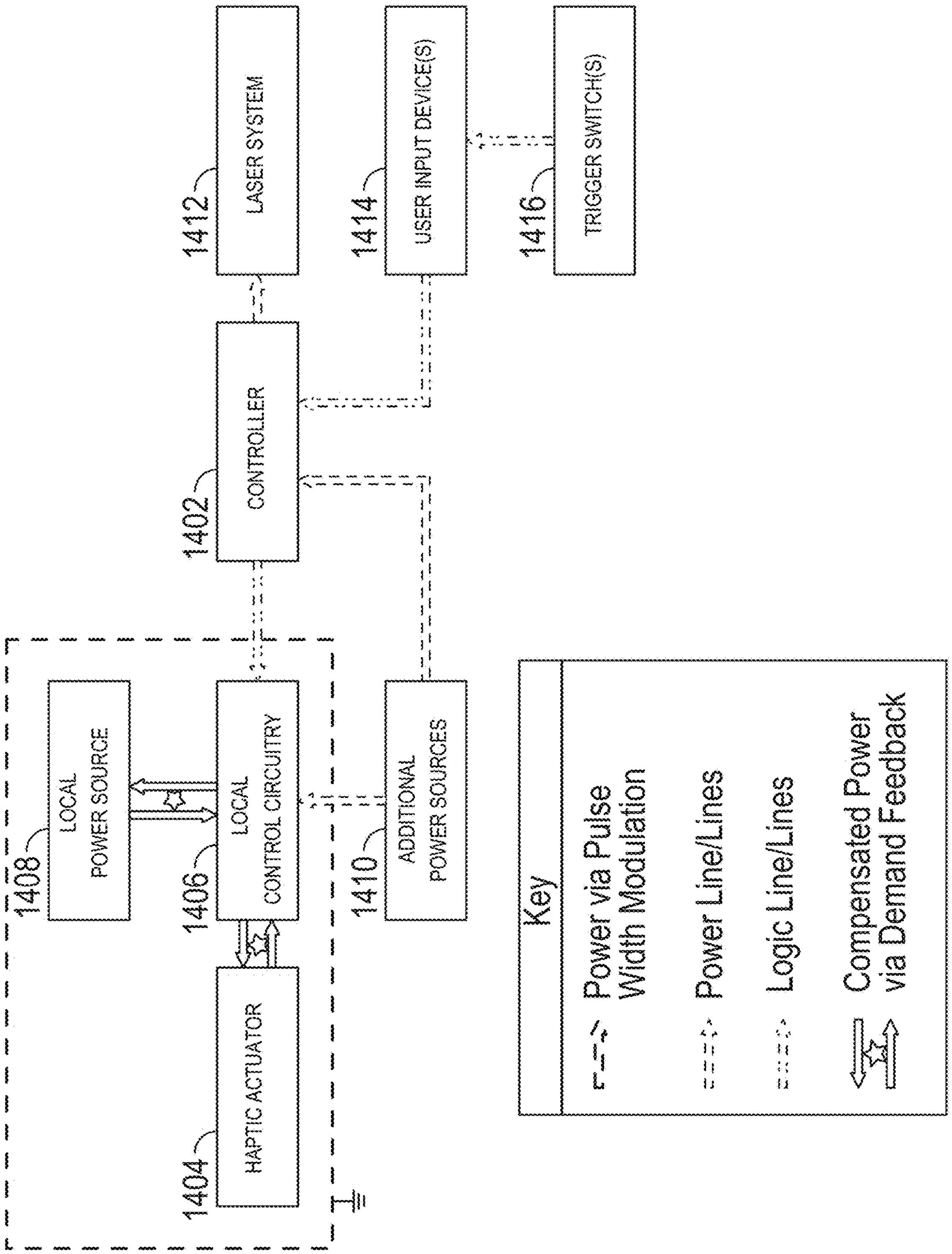
FIG. 14 is a schematic diagram of various electronic components of the peripheral device shown in FIGS. 3 to 11, according to an embodiment.

FIG. 14 is a schematic diagram of various electronic components of peripheral device 300 shown in FIGS. 3 to 11, according to an embodiment. In one embodiment, a controller 1402 (e.g., control circuitry 1406 of FIG. 11) may be programmed to control haptic actuator 1404 to create a pre-determined reaction force/impulse corresponding to a particular firearm being simulated. Controller 1402 may be configured to interact with local control circuitry 1406 that is associated with an individual haptic actuator 1404. Local control circuitry 1406 and haptic actuator 1404 may be powered by a local power source 1408 (e.g., energy storage devices 340*a*, 340*b*, and 340*c* of FIG. 11). As shown in the key in FIG. 14, power source 1408 may provide power to control circuitry 1406, and control circuitry 1406 may provide power to haptic actuator 1404 such that the provided power is compensated power via demand feedback.

In some embodiments, one or more additional power sources 1410 may be provided. For example, power supply 1408 may be 72 volt power supply that powers haptic actuator 1404, while power supply 1410 may be a 24 volt power supply that provides power to control circuitry 1406. Controller 1402 may control other components of peripheral device 300. For example, peripheral device may include a laser system 1412, one or more user input devices 1414 (e.g., side buttons 316*a* and 316*b*, directional touch pads 318*a* and 318*b*, of FIGS. 4 and 5, etc.), a trigger switch 1416 (e.g., trigger 304 of FIGS. 3 to 5 and 11), etc.

In certain embodiments, Pulse-Width Modulation or (PWM) may be used as an advantageous method of control for power delivered to haptic actuator 1404 (e.g., see key in FIG. 14). The PWM technique (i.e., a type of modulation) may be used to encode a message into a pulsing signal. Although this modulation technique may be used to encode information for transmission, its main use in embodiments disclosed herein is to allow the control of the power supplied to the haptic actuator. The average value of voltage (and current) fed to the load (i.e., to haptic actuator 1404) may be controlled by turning a switch between supply (e.g., power source 1408 and/or 1410) and load (e.g., haptic actuator 1404) on and off at a fast rate. The longer the switch is on compared to the off periods, the higher the total power supplied to the load. The PWM switching frequency may be chosen to be much higher than what would affect the load (i.e., the device that uses the power), which is to say that the resultant waveform perceived by the load must be as smooth as possible. Typically switching is done at frequencies of tens of kHz for a motor drive. For example, in one embodiment, PWM may be used to drive haptic actuator 1404 at a frequency in a range of 10 kHz to 30 kHz for recoil/shock generation. Use of this PWM technique may be advantageous for keeping power consumption low and for achieving repeatability in movements generated by the haptic actuator.

The duty cycle describes the proportion of "on" time to the regular interval or "period" of time; a low duty cycle corresponds to low power because the power is off for most of the time. Duty cycle may be expressed in percent, with 100% being fully on. One of the main advantages of PWM use with the particular haptic actuator applications described herein is that power loss in switching devices tends to be very low. When a switch is off there is practically no current. When the switch is on and power is being transferred to the load, there is almost no voltage drop across the switch. Power loss, being the product of voltage and current, is thus in both cases close to zero. By adjusting the haptic actuator's duty cycle (i.e., changing a ratio of when the switch is ON versus OFF), power saving may be achieved, especially in cases of untethered use where battery/power sources are limited and at a premium. In one embodiment, the haptic actuator system may use a super-capacitor pack (e.g., energy storage devices 340*a* to 340*c* of FIG. 11) as the power source. For such a power source, the duty cycle/PWM may be chosen such that power consumption is optimized based on the duty cycle for producing recoil, and the resolution of the haptic actuator (minimum repeatable linear movement) is optimized based on the PWM needed to generate a particular recoil/shock.

As mentioned above, tracking systems may be used to track a user and/or apparatus (e.g., peripheral device 300 of FIGS. 3 to 11) in real time for gaming and/or simulation purposes. For example, tracking of user/peripheral device locomotion may be used by the controller/computing device to control and influence the virtual reality simulation. Such motion information may be determined by tracking systems (e.g., using magnetic or optical tracking of peripheral device 300) as well as based on signals generated via controls on peripheral device 300 (e.g., side buttons 316*a* and 316*b*, directional touch pads 318*a* and 318*b*, of FIGS. 4 and 5, etc.).

A user 102 (e.g., see FIG. 1) may also be tracked directly by magnetic or optical tracking instead of indirectly by applying the tracking only to peripheral device 300 (e.g., using tracking device 332 of FIG. 10). Thus, by measuring and tracking additional locomotion (e.g., of user 102 as well as of peripheral device 300) a more immersive and comprehensive level of realism may be obtained in game play and training simulation. While peripheral device 300 is discussed in the above examples, other devices, including various gaming devices described herein, may be tracked in other embodiments.

Disclosed systems may include various tracking devices to determine, in real time, position and orientation of an object (e.g., peripheral device 106 of FIG. 1) or person in a room, building, or in the world. Time of flight systems determine a distance of an object by measuring a time of propagation of pulsed signals between a transmitter and receiver. When distances of at least three locations are known, a fourth position may be determined using trilateration. In other embodiments, optical trackers, such as laser ranging trackers, may also be used. However, these systems may suffer from line of sight problems and their performance may be adversely affected by ambient light and infrared radiation. On the other hand, such systems do not suffer from distortion effects in the presence of metals and may have high update rates because of the high speed of light.

In other embodiments, ultrasonic trackers may also be used. These systems, however, tend to have a more limited range due to loss of energy with the distance traveled. Such systems may also be sensitive to ultrasonic ambient noise and have a low update rate. One advantage of ultrasonic systems, however, is that they do not rely on a line of sight. Systems using radio waves, such as Global navigation satellite systems, do not suffer because of ambient light, but still need a line of sight. In other embodiments, a spatial scan system may also be used. These systems may typically use (optical) beacons and sensors. Two categories may be distinguished: (1) inside-out systems, where a beacon is placed at a fixed position in the environment and a sensor is located on the object being tracked, and (2) outside-in systems, where beacons are located on the target objected being tracked, and sensors are at a fixed position in the environment. By aiming the sensor at the beacon, the angle between the sensor and beacon may be measured. With triangulation, the position of the object may be determined.

In other embodiments, inertial sensing systems may also be used and one advantage of such systems is that they do not require an external reference. Instead, these systems measure rotation with a gyroscope or position with an accelerometer with respect to a known starting position and orientation. Because these systems measure relative positions instead of absolute positions, they may suffer from accumulated errors and are therefore subject to drift. A periodic re-calibration of the system, however, may provide increased accuracy.

In other embodiments, mechanical linkage systems may also be used. These systems may use mechanical linkages between the reference and the target. Two example types of linkages may be used. One is an assembly of mechanical parts that may each rotate, providing the user with multiple rotation capabilities. The orientation of the linkages may be computed from the various linkage angles measured with incremental encoders or potentiometers. Other types of mechanical linkages may include wires that are rolled in coils. A spring system may ensure that the wires are tensed in order to measure distances accurately. The degrees of freedom sensed by mechanical linkage trackers are dependent upon the constitution of the tracker's mechanical structure. While six degrees of freedom are most often provided, typically only a limited range of motions is possible because of the kinematics of the joints and the length of each link. Also, the weight and the deformation of the structure may increase with distance of the target from the reference and impose a limit on the working volume.

In other embodiments, phase difference systems may be used. These systems measure the shift in phase of an incoming signal from an emitter on a moving target compared to the phase of an incoming signal from a reference emitter. With such embodiments, the relative motion of the emitter with respect to the receiver may be calculated. Like inertial sensing systems, phase-difference systems may suffer from accumulated errors and are therefore subject to drift, but because the phase may be measured continuously, such systems are able to generate high data rates.

In other embodiments, direct field sensing systems may also be used. These systems use a known field to derive orientation or position: a simple compass, for example, uses the Earth's magnetic field to determine its orientation in two directions. An inclinometer may use the Earth's gravitational field to determine its orientation in the remaining third direction. The field used for positioning does not need to originate from nature, however. A system of three electromagnets placed perpendicular to one another, for example, may define a spatial reference. On a receiver, three sensors measure components of the field's flux received as a consequence of magnetic coupling. Based on these measures, the system may determine the position and orientation of the receiver with respect to the emitters' reference. Because each system, described herein, has its pros and cons, most systems may use more than one technology. A system based on relative position changes like the inertial system may need periodic calibration against a system with absolute position measurement.

Systems combining two or more positioning technologies are called hybrid positioning systems and may be used with the various disclosed embodiments. In one embodiment, magnetic tracking may be used with a firearm peripheral body (e.g., peripheral device 106 of FIG. 1) to substantially track its motion. In other embodiments, optical tracking of a peripheral body may be accomplished by placing optical markers on the body in key points that may not be obstructed by a user and may allow pre-programmed cameras (optical trackers) to successfully track the orientation of the body for gaming and simulations training. In a further embodiment, direct field sensing may be used to track a body through use of a gyroscopic sensor or other inertial sensor placed on the body to gauge changes in angular orientation and by magnetic tracking placed on body.

The use of two sensors adds to the achievable resolution for tracking a peripheral body. In one embodiment, direct field sensing (magnetic & inertial tracking) may be used together with optical tracking to track a firearm peripheral body for enhanced resolution of a determined position of the body in 3D space. This may be accomplished by using optical tracking to calibrate direct field sensing trackers with an absolute positioning reference and thereby avoiding drift. In exemplary embodiments, a peripheral body (e.g., peripheral device 106 of FIG. 1) may be any type of simulated body providing haptic effects, including gaming devices/peripherals or firearms.

Further, as described above, virtual reality scenarios using HMDs and projection based displays (e.g., traditional screen displays/projection systems that have been miniaturized and affixed to the user's head) are increasingly becoming necessary for generating ever more accurate and successful simulation and game play environments. Such display systems may include an HMD (or helmet mounted display, for example for aviation applications) that is a display device, worn on the head of a user or as part of a helmet, which may have a small display optic in front of one eye (monocular HMD) or in front of each eye (binocular HMD).

An optical head-mounted display (OHMD) may also be used, which is a wearable display that has the capability of reflecting projected images as well as allowing the user to see through it. A typical HMD may have either one or two small displays with lenses and semi-transparent mirrors embedded in a helmet, in eyeglasses (also known as data glasses), or in a visor. The display units may be miniaturized and may include a cathode ray tube (CRT), a liquid crystal display (LCD), a liquid crystal on silicon (LCos), or an organic light-emitting diode (OLED). Some vendors may employ multiple micro-displays to increase total resolution and field of view. HMDs differ in whether they can display just a computer generated image (CGI), show live images from the real world, or a combination of both. Most HMDs display only a computer-generated image, sometimes referred to as a virtual image. Some HMDs may allow a CGI to be superimposed on a real-world view. This may sometimes be referred to as augmented reality or mixed reality. Combining a real-world view with CGI may be done by projecting the CGI through a partially reflective mirror and viewing the real world directly. This method is often called "optical see-through." Combining a real-world view with CGI may also be done electronically by accepting video from a camera and mixing it electronically with CGI. This method is often called "video see-through."

An optical HMD may use an optical mixer made of partly silvered mirrors. Such HMDs have the capability of reflecting artificial images as well as letting real images cross a lens to allow the user to view real images. Various techniques exist for use with see-through HMD's. Most of these techniques may be categorized as falling into one of two main families: "curved mirror" based and "waveguide" based. The curved mirror technique has been used by Vuzix in their Star 1200 product and by Laster Technologies. Various waveguide techniques include, but are not limited to, diffraction optics, holographic optics, polarized optics, and reflective optics.

Low cost HMD devices are available for use with 3D games and entertainment applications. One of the first commercially available HMDs was the Forte VFX-1 which was announced at Consumer Electronics Show (CES) in 1994. The VFX-1 had stereoscopic displays, 3-axis head tracking, and stereo headphones. Another pioneer in this field was Sony Corporation, who released the Glasstron in 1997, which had as an optional accessory a positional sensor which permitted the user to view the surroundings, with the perspective moving as the head moved, providing a deep sense of immersion.

One application of this technology was in the game Mech Warrior® 2, which permitted users of the Sony Glasstron or Virtual I/O Inc.'s iGlasses to adopt a new visual perspective from inside the cockpit of a craft, using their own eyes to see a battlefield through their craft's own cockpit. Many brands of video glasses may now be connected to video and DSLR cameras, making them applicable as a new-age monitor. As a result of the glasses' ability to block out ambient light, filmmakers and photographers are able to see clearer presentations of their live images. The Oculus Rift®, for example, is a virtual reality (VR) head-mounted display created by Palmer Luckey, and being developed by Oculus VR, Inc. for virtual reality simulations and video games. VR headsets are also planned for use with game consoles like the Xbox One® and the P54®.

Disclosed gaming and simulation embodiments may be used with the above-described systems. For example, an HMD 104 (e.g., see FIG. 1) may be used in a simulation system that incorporates a peripheral device (e.g., peripheral device 106 of FIG. 1, peripheral device 300 of FIGS. 3 to 11, etc.), including a haptic actuator recoil/shock system (e.g., haptic actuators 336, 338*a*, 339*a*, 338*b*, and 339*b* of FIG. 11, haptic actuators 1300*a*, 1300*b*, and 1300*c* of FIGS. 13A, 13B, and 13C, respectively, etc.). Such a system may allow a user 102 (e.g., see FIG. 1) to fire, using a three-dimensionally (3D) tracked peripheral device, at simulated targets inside a 3D virtual space, while the peripheral device generates recoil forces/impulses to emulate gun fire.

A computer system that generates the virtual space may utilize the Unity development environment/platform or Unreal Engine® development environment/platform or a similar development environment. The Unity development platform is a flexible and powerful development engine for creating multiplatform 3D and 2D games and interactive experiences. The Unity development platform, and other platforms such as the Unreal Engine® platform, are used in a wide array of industries for the creation of immersive simulation and gaming environments. For example, a Unity plugin/game, Dynamic Link Library (DLL), and/or other plugin/game may interface with haptic actuator 1404 via controllers 1402 and 1406 (e.g., see FIG. 14) though serial, CAN bus, and/or other communications bus/protocols.

Figure 15:
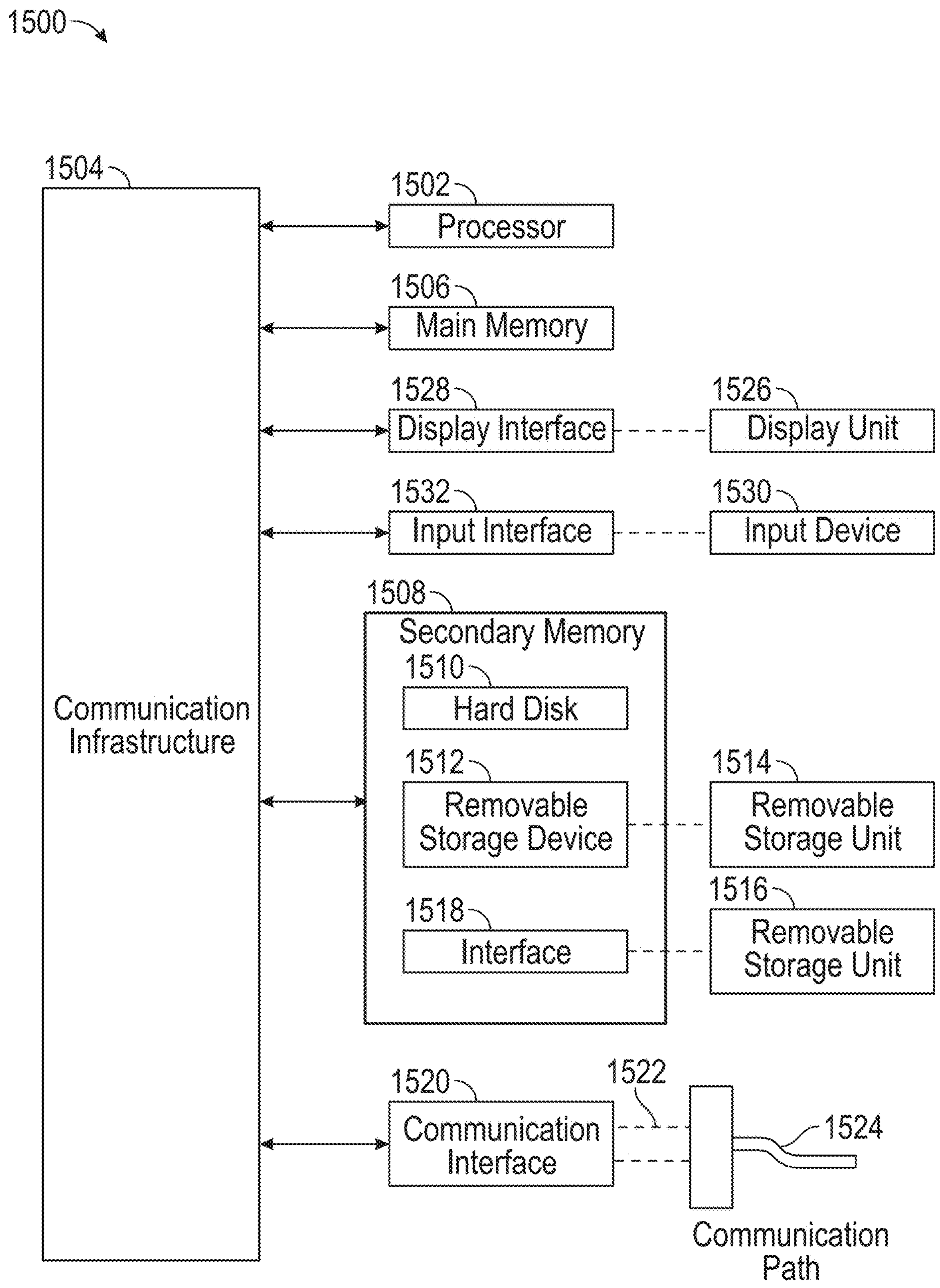
FIG. 15 is a block diagram of an example computer system, in which disclosed embodiments may be implemented, according to an embodiment of the present disclosure.

FIG. 15 is a block diagram of an example computer system 1500 in which disclosed embodiments of, or portions thereof, may be implemented as computer-readable code (i.e., machine-readable computer program instructions), which is executed by one or more processors causing the one or more processors to perform operations of the disclosed embodiments, according to an embodiment. Various disclosed computing and control systems be implemented using hardware, firmware, or software using system components such as described below with reference to FIG. 15.

Disclosed systems may include components implemented on computer system 1500 using hardware, software, firmware, tangible computer-readable (i.e., machine-readable) media having computer program instructions stored thereon, or a combination thereof, and may be implemented in one or more computer systems or other processing system. If programmable logic is used, such logic may be executed on a commercially available processing platform or a on a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

Various disclosed embodiments are described in terms of this example computer system 1500. After reading this description, persons of ordinary skill in the relevant art will know how to implement disclosed embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As persons of ordinary skill in the relevant art will understand, a computing device for implementing disclosed embodiments has at least one processor, such as processor 1502, wherein the processor may be a single processor, a plurality of processors, a processor in a multi-core/multiprocessor system, such system operating alone, or in a cluster of computing devices operating in a cluster or server farm. Processor 1502 may be connected to a communication infrastructure 1504, for example, a bus, message queue, network, or multi-core message-passing scheme.

Computer system 1500 may also include a main memory 1506, for example, random access memory (RAM), and may also include a secondary memory 1508. Secondary memory 1508 may include, for example, a hard disk drive 1510, removable storage drive 1512. Removable storage drive 1512 may include a floppy disk drive, a magnetic tape drive, an optical disk drive, a flash memory, or the like. The removable storage drive 1512 may be configured to read and/or write data to a removable storage unit 1514 in a well-known manner. Removable storage unit 1514 may include a floppy disk, magnetic tape, optical disk, etc., which is read by and written to, by removable storage drive 1512. As will be appreciated by persons of ordinary skill in the relevant art, removable storage unit 1514 may include a computer readable storage medium having computer software (i.e., computer program instructions) and/or data stored thereon.

In alternative implementations, secondary memory 1508 may include other similar devices for allowing computer programs or other instructions to be loaded into computer system 1500. Such devices may include, for example, a removable storage unit 1516 and an interface 1518. Examples of such devices may include a program cartridge and cartridge interface (such as that found in video game devices), a removable memory chip (such as EPROM or PROM) and associated socket, and other removable storage units 1516 and interfaces 1518 which allow software and data to be transferred from the removable storage unit 1516 to computer system 1500.

Computer system 1500 may also include a communications interface 1520. Communications interface 1520 allows software and data to be transferred between computer system 1500 and external devices. Communications interface 1520 may include a modem, a network interface (such as an Ethernet card), a communications port, a PCMCIA slot and card, or the like. Software and data transferred via communications interface 1520 may be in the form of signals 1522, which may be electronic, electromagnetic, optical, acoustic, or other signals capable of being received by communications interface 1520. These signals may be provided to communications interface 1520 via a communications path 1524.

In this document, the terms "computer program storage medium" and "computer usable storage medium" are used to generally refer to storage media such as removable storage unit 1514, removable storage unit 1516, and a hard disk installed in hard disk drive 1510. Computer program storage medium and computer usable storage medium may also refer to memories, such as main memory 1506 and secondary memory 1508, which may be semiconductor memories (e.g., DRAMS, etc.). Computer system 1500 may further include a display unit 1526 that interacts with communication infrastructure 1504 via a display interface 1528. Computer system 1500 may further include a user input device 1530 that interacts with communication infrastructure 1504 via an input interface 1532. A user input device 1530 may include a mouse, trackball, touch screen, or the like.

Computer programs (also called computer control logic or computer program instructions) are stored in main memory 1506 and/or secondary memory 1508. Computer programs may also be received via communications interface 1520. Such computer programs, when executed, enable computer system 1500 to implement embodiments as discussed herein. In particular, computer programs, when executed, enable processor 1502 to implement the processes of disclosed embodiments, such as various stages in disclosed methods, as described in greater detail above. Accordingly, such computer programs represent controllers of the computer system 1500. When an embodiment is implemented using software, the software may be stored in a computer program product and loaded into computer system 1500 using removable storage drive 1512, interface 1518, and hard disk drive 1510, or communications interface 1520. A computer program product may include any suitable non-transitory machine-readable (i.e., computer-readable) storage device having computer program instructions stored thereon.

Embodiments may be implemented using software, hardware, and/or operating system implementations other than those described herein. Any software, hardware, and operating system implementations suitable for performing the functions described herein may be utilized. Embodiments are applicable to both a client and to a server or a combination of both.

The disclosure sets forth example embodiments and, as such, is not intended to limit the scope of embodiments of the disclosure and the appended claims in any way. Embodiments have been described above with the aid of functional building blocks illustrating the implementation of specified functions and relationships thereof. The boundaries of these functional building blocks have been arbitrarily defined herein for the convenience of the description. Alternate boundaries can be defined to the extent that the specified functions and relationships thereof are appropriately performed.

The foregoing description of specific embodiments will so fully reveal the general nature of embodiments of the disclosure that others can, by applying knowledge of those of ordinary skill in the art, readily modify and/or adapt, for various applications, such specific embodiments, without undue experimentation, without departing from the general concept of embodiments of the disclosure. Therefore, such adaptation and modifications are intended to be within the meaning and range of equivalents of the disclosed embodiments, based on the teaching and guidance presented herein. The phraseology or terminology herein is for the purpose of description and not of limitation, such that the terminology or phraseology of the specification is to be interpreted by persons of ordinary skill in the relevant art in light of the teachings and guidance presented herein.

The breadth and scope of embodiments of the disclosure should not be limited by any of the above-described example embodiments, but should be defined only in accordance with the following claims and their equivalents. Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations, or that one or more implementations necessarily include logic for deciding, with or without user input or prompting, whether these features, elements, and/or operations are included or are to be performed in any particular implementation.

The specification and annexed drawings disclose examples of systems, apparatus, devices, and techniques that provide an immersive simulation experience to users of the system. It is, of course, not possible to describe every conceivable combination of elements and/or methods for purposes of describing the various features of the disclosure, but those of ordinary skill in the art recognize that many further combinations and permutations of the disclosed features are possible. Accordingly, various modifications may be made to the disclosure without departing from the scope or spirit thereof. Further, other embodiments of the disclosure may be apparent from consideration of the specification and annexed drawings, and practice of disclosed embodiments as presented herein. Examples put forward in the specification and annexed drawings should be considered, in all respects, as illustrative and not restrictive. Although specific terms are employed herein, they are used in a generic and descriptive sense only, and not used for purposes of limitation.

What is claimed is:

1. A peripheral device for a simulation and gaming system, comprising:

a body configured to resemble a firearm;

a first capacitive sensor mounted on the body at a first location that corresponds to a location on an actual firearm that would be manipulated by a user's hand to mount a new ammunition magazine on the firearm, wherein the first capacitive sensor generates a first capacitive signal in response to a user's hand drawing near to and/or touching the first capacitive sensor;

a haptic actuator mounted on the body and configured to generate at least one haptic effect; and at least one controller mounted on the body and functionally coupled to the first capacitive sensor and the haptic actuator, wherein the at least one controller is configured to generate a first operation signal based on the first capacitive signal, wherein the first operation signal can be used by a virtual reality controller to generate virtual reality images that portray the user mounting a new ammunition magazine on the firearm.

2. The peripheral device of claim 1, further comprising a second capacitive sensor that is mounted on the body at a second location that corresponds to a location of a cocking mechanism of the firearm, wherein the second capacitive sensor generates a second capacitive signal in response to a user's hand drawing near to and/or touching the second capacitive sensor, wherein the at least one controller is coupled to the second capacitive sensor, and wherein the at least one controller is configured to generate a second operation signal based on the second capacitive signal, wherein the second operation signal can be used by a virtual reality controller to generate virtual reality images that portray the user cocking the firearm.

3. The peripheral device of claim 1, further comprising a second capacitive sensor that is mounted on the body at a second location that corresponds to a location of an ammunition charging or loading mechanism of the firearm, wherein the second capacitive sensor generates a second capacitive signal in response to a user's hand drawing near to and/or touching the second capacitive sensor, wherein the at least one controller is coupled to the second capacitive sensor, and wherein the at least one controller is configured to generate a second operation signal based on the second capacitive signal, wherein the second operation signal can be used by a virtual reality controller to generate virtual reality images that portray the user conducting an ammunition charging or loading operation.

4. The peripheral device of claim 1, further comprising a second capacitive sensor that is mounted on the body at a second location that corresponds to a location of a trigger, wherein the second capacitive sensor generates a second capacitive signal in response to a user's hand drawing near to and/or touching the second capacitive sensor, wherein the at least one controller is coupled to the second capacitive sensor, and wherein the at least one controller is configured to generate a second operation signal based on the second capacitive signal, wherein the second operation signal can be used by a virtual reality controller to generate virtual reality images that portray the user triggering the firearm.

5. The peripheral device of claim 4, wherein the second capacitive sensor is configured to generate a second capacitive signal that is indicative of an amount of force that a user's finger applies to the second capacitive sensor, and wherein the second operation signal includes information about the amount of force that a user's finger applies to the second capacitive sensor.

6. The peripheral device of claim 4, wherein the second capacitive sensor is configured to generate a second capacitive signal that is indicative of which of a user's left and right hands drew near to and/or touched the second capacitive sensor, and wherein the second operation signal generated by the at least one controller can be used by a virtual reality controller to generate virtual reality images that portray the user triggering the firearm with a finger of the hand indicated by the second capacitive signal.

7. The peripheral device of claim 1, further comprising a second capacitive sensor that is mounted on the body at a second location that corresponds to a location of a movable lid or cover of the firearm, wherein the second capacitive sensor generates a second capacitive signal in response to a user's hand drawing near to and/or touching the second capacitive sensor, wherein the at least one controller is coupled to the second capacitive sensor, and wherein the at least one controller is configured to generate a second operation signal based on the second capacitive signal, wherein the second operation signal can be used by a virtual reality controller to generate virtual reality images that portray the user opening or closing a lid or cover of the firearm.

8. The peripheral device of claim 7, wherein the second capacitive sensor is configured to generate a second capacitive signal that is indicative of which of a user's left and right hands drew near to and/or touched the second capacitive sensor, and wherein the second operation signal generated by the at least one controller can be used by a virtual reality controller to generate virtual reality images that portray the user opening and or closing the lid or cover of the firearm with the hand indicated by the second capacitive signal.

9. The peripheral device of claim 1, wherein the first capacitive sensor is configured to generate a first capacitive signal that is indicative of which of a user's left and right hands draws near to and/or touches the first capacitive sensor, and wherein the first operation signal generated by the at least one controller can be used by a virtual reality controller to generate virtual reality images that portray the user mounting a new ammunition magazine on the firearm with the hand indicated by the first capacitive signal.

10. The peripheral device of claim 1, wherein the body includes a grip, the peripheral device further comprising a second capacitive sensor mounted on or adjacent the grip, wherein the second capacitive sensor is configured to generate a second capacitive signal in response to a user's hand drawing near to and/or touching the second capacitive sensor, the second capacitive signal indicating which of the user's left and right hands drew near to and/or touched the second capacitive sensor, wherein the at least one controller is functionally coupled to the second capacitive sensor, wherein the at least one controller is configured to generate a handedness signal based on the second capacitive signal, and wherein the handedness signal can be used by a virtual reality controller to generate virtual reality images that portray the user grasping a grip of a firearm with the hand indicated by the second capacitive signal and mounting a new ammunition magazine on the firearm with the hand other than the one indicated by the second capacitive signal.

11. A peripheral device for a simulation and gaming system, comprising:

a body configured to resemble a firearm;

a first capacitive sensor mounted on the body at a first location that corresponds to a location on an actual firearm that would be manipulated by a user's hand to conduct a cocking operation, wherein the first capacitive sensor generates a first capacitive signal in response to a user's hand drawing near to and/or touching the first capacitive sensor;

a haptic actuator mounted on the body and configured to generate at least one haptic effect; and at least one controller mounted on the body and functionally coupled to the first capacitive sensor and the haptic actuator, wherein the at least one controller is configured to generate a first operation signal based on the first capacitive signal, wherein the first operation signal can be used by a virtual reality controller to generate virtual reality images that portray the user conducting a cocking operation on the firearm.

12. A peripheral device for a simulation and gaming system, comprising:

a body configured to resemble a firearm;

a first capacitive sensor mounted on the body at a first location that corresponds to a location on an actual firearm that would be manipulated by a user's hand to conduct an ammunition charging or loading operation, wherein the first capacitive sensor generates a first capacitive signal in response to a user's hand drawing near to and/or touching the first capacitive sensor;

a haptic actuator mounted on the body and configured to generate at least one haptic effect; and at least one controller mounted on the body and functionally coupled to the first capacitive sensor and the haptic actuator, wherein the at least one controller is configured to generate a first operation signal based on the first capacitive signal, wherein the first operation signal can be used by a virtual reality controller to generate virtual reality images that portray the user conducting an ammunition charging or loading operation on the firearm.

13. A peripheral device for a simulation and gaming system, comprising:

a body configured to resemble a firearm;

a first capacitive sensor mounted on the body at a first location that corresponds to a location of a trigger on an actual firearm that would be manipulated by a user's hand to trigger the firearm, wherein the first capacitive sensor generates a first capacitive signal in response to a user's hand drawing near to and/or touching the first capacitive sensor;

a haptic actuator mounted on the body and configured to generate at least one haptic effect; and at least one controller mounted on the body and functionally coupled to the first capacitive sensor and the haptic actuator, wherein the at least one controller is configured to generate a first operation signal based on the first capacitive signal, wherein the first operation signal can be used by a virtual reality controller to generate virtual reality images that portray the user triggering the firearm.

14. The peripheral device of claim 13, wherein the first capacitive sensor is configured to generate a first capacitive signal that is indicative of an amount of force that a user's finger applies to the first capacitive sensor, and wherein the first operation signal includes information about the amount of force that a user's finger applies to the first capacitive sensor.

15. The peripheral device of claim 13, wherein the first capacitive sensor is configured to generate a first capacitive signal that is indicative of which of a user's left and right hands drew near to and/or touched the first capacitive sensor, and wherein the first operation signal generated by the at least one controller can be used by a virtual reality controller to generate virtual reality images that portray the user triggering the firearm with a finger of the hand indicated by the first capacitive signal.

16. A peripheral device for a simulation and gaming system, comprising:

a body configured to resemble a firearm;

a first capacitive sensor mounted on the body at a first location that corresponds to a location of a movable lid or cover of the firearm, wherein the first capacitive sensor generates a first capacitive signal in response to a user's hand drawing near to and/or touching the first capacitive sensor;

a haptic actuator mounted on the body and configured to generate at least one haptic effect; and at least one controller mounted on the body and functionally coupled to the first capacitive sensor and the haptic actuator, wherein the at least one controller is configured to generate a first operation signal based on the first capacitive signal, wherein the first operation signal can be used by a virtual reality controller to generate virtual reality images that portray the user opening or closing a lid or cover of the firearm.

17. The peripheral device of claim 16, wherein the first capacitive sensor is configured to generate a first capacitive signal that is indicative of which of a user's left and right hands drew near to and/or touched the first capacitive sensor, and wherein the first operation signal generated by the at least one controller can be used by a virtual reality controller to generate virtual reality images that portray the user opening and or closing the lid or cover of the firearm with the hand indicated by the first capacitive signal.

* * * * *